US006595707B1

(12) United States Patent
Kuwata

(10) Patent No.: US 6,595,707 B1
(45) Date of Patent: Jul. 22, 2003

(54) CODE CONVERSION CIRCUIT FOR OPTICAL DUOBINARY TRANSMISSION AND OPTICAL TRANSMITTER AND RECEIVER USING SAME

(75) Inventor: Naoki Kuwata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/443,139

(22) Filed: Nov. 19, 1999

(30) Foreign Application Priority Data

Nov. 25, 1998 (JP) .......................... 10-334278

(51) Int. Cl.[7] .................. H04B 10/00; H04L 25/49
(52) U.S. Cl. .................... 398/140; 375/291
(58) Field of Search .................. 359/154; 375/290, 375/291; 398/140

(56) References Cited

U.S. PATENT DOCUMENTS 6,246,731 B1 * 6/2001 Brianti et al. .......... 360/40
6,313,932 B1 * 11/2001 Roberts et al. .......... 359/123

FOREIGN PATENT DOCUMENTS

| JP | 8-139681  | 5/1996 |
| JP | 9-236781  | 9/1997 |
| JP | 10-112688 | 4/1998 |
| JP | 10-164010 | 6/1998 |

OTHER PUBLICATIONS

The Communication Society Convention, 1998, the Institute of the Electronics, Information and Communications Engineers. (Partial Translation is attached).

Doran, N.J., "High–Speed TDM II", OFC '97 Technical Digest, vol. 6, Feb. 16–21, 1997, pp. 268–269.

Yoneyama et al., "Differential Precoder IC Modules for Over–20–Gbit/s Optical Duobinary Transmission Systems", IEEE MIT–S International Microwave Symposium, 1999. (Brief Comments on MIT–S '99 attached).

* cited by examiner

*Primary Examiner*—Jason Chan
*Assistant Examiner*—Shi K. Li
(74) *Attorney, Agent, or Firm*—Staas & Halsey LLP

(57) ABSTRACT

A code conversion circuit provided with a bit distributing unit for dividing a high speed input signal into N ways of low speed signals, N number of code converters for performing code conversion on the N ways of low speed signals, and a bit combining unit for receiving as input code-converted low speed signals output from the N number of code converters and logically adding and combining these to produce a code-converted high speed output signal, whereby it becomes possible to ease the harsh restriction on the delay time with respect to one time slot imposed on a delay element in a pre-coder used for optical duobinary transmission.

17 Claims, 22 Drawing Sheets

CODE CONVERSION CIRCUIT FOR OPTICAL DUOBINARY TRANSMISSION AND OPTICAL TRANSMITTER AND RECEIVER USING SAME

BACKGROUND OF THE INVENTION

1. Field of the Invention

The present invention relates to a code conversion circuit for optical duobinary transmission and to an optical transmitter and receiver using the same.

An optical transmission system is generally configured to receive as input an electrical signal to be transmitted directly to an optical modulator, convert this to an optical signal, and launch the thus converted optical signal to an optical fiber to transmit it to a receiving side.

In recent years, however, along with the increase in transmission capabilities, increasingly harsh demands have been placed on the characteristics of optical fibers. First, there is the demand for realization of long distance optical fiber transmission so as to enable transmission of light without repeaters. Second, there is the demand for transmission of superhigh speed signals, for example, the realization of superhigh speed optical fiber transmission exceeding 10 Gb/s.

In such superhigh speed, long distance optical fiber transmission, the quality of the transmitted signal ends up deteriorating due to the wavelength dispersion characteristic distinctive to optical fibers, which makes transmissions difficult. Therefore, optical duobinary transmission has already been proposed, as a so-called high "dispersion tolerance" transmission system, and studies conducted toward its commercialization.

The present invention relates to a code conversion circuit for such optical duobinary transmission.

2. Description of the Related Art

As will be explained in detail later using the drawings, a first example of a code conversion circuit called a pre-coder has already been proposed, but as will be explained later, suffers from the disadvantage that a signal of a completely different bit pattern from the desired output signal ends up being produced. To eliminate this disadvantage, a later explained second example of a pre-coder has been proposed.

This second example of a pre-coder operates normally when the delay time Td at its delay element (mentioned later) is shorter than one time slot TS, but no longer operates normally when the Td is longer than one time slot TS. In superhigh speed optical transmission, 20 Gb/s or 40 Gb/s speeds will be realized in the future. When this happens, one time slot TS will become further shorter, that is, 50 ps or 25 ps. Even if improvements in IC process technology raise the maximum operating speed and enable the circuit delay to be made smaller, the delay time due to the wirings etc. will remain unchanged. Therefore, the ratio of the delay time due to the wirings in the total delay time Td will become larger as the time slot TS becomes shorter and it will become more difficult to make the delay time Td shorter than the time slot TS. When this happens, normal operation of the pre-coder will no longer be able to be ensured.

SUMMARY OF THE INVENTION

An object of the present invention is to provide a code conversion circuit in an optical transmitter or optical receiver for superhigh speed transmission which ensures normal operation even if including a delay element with a delay time exceeding the time of one time slot of an input signal.

To attain the above object, the code conversion circuit of the present invention provides a bit distributing unit (21) for dividing a high speed input signal (IN) into N ways of low speed signals (in1, in2 . . . ), N number of code converters (22-1 to 22-N) for performing code conversion on the N ways of low speed signals, and a bit combining unit (23) for receiving as input the code-converted low speed signals (out1, out2 . . . ) output from the N number of code converters and logically adding and combining these to produce a code-converted high speed output signal OUT. As a result, it becomes possible to ease the harsh restriction of one time slot on the delay time imposed on a delay element in a pre-coder used for optical duobinary transmission.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 16:
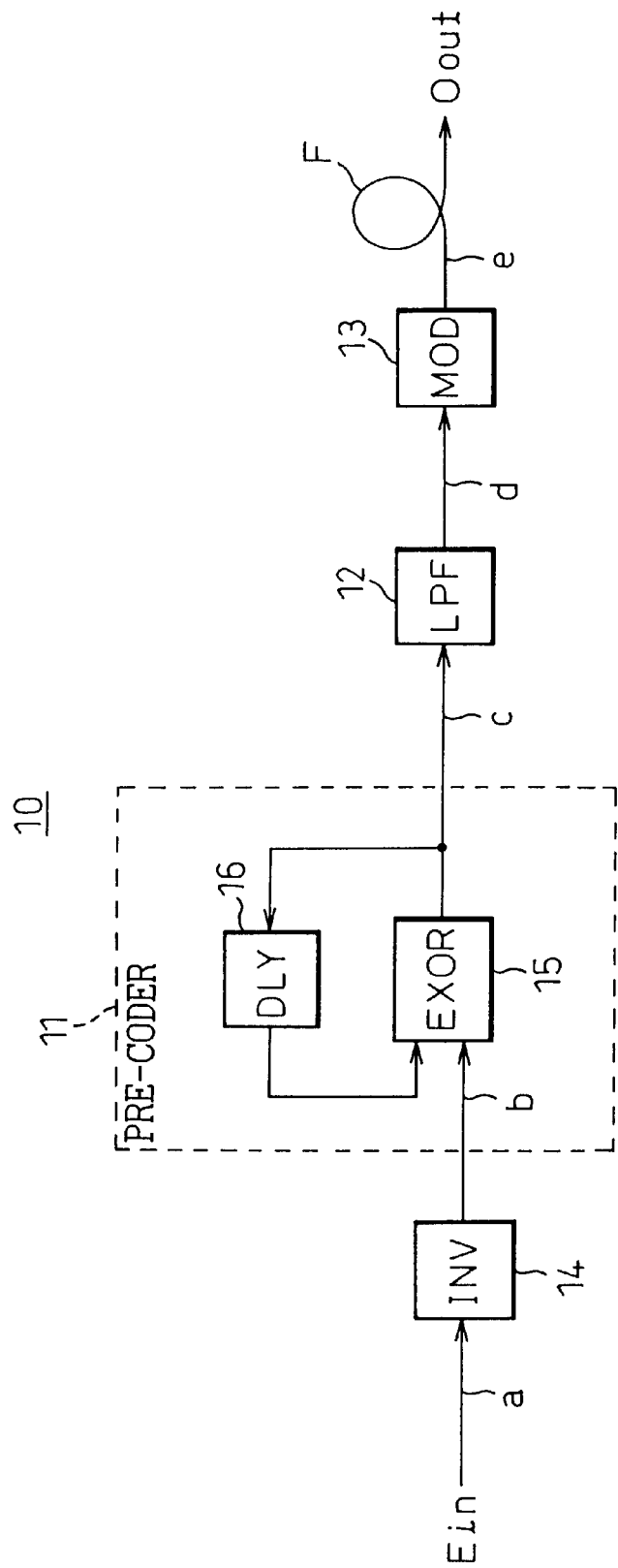
FIG. 16 is a view of an optical transmitter of the related art used for optical duobinary transmission.

FIG. 16 is a view of an optical transmitter of the related art used for optical duobinary transmission.

In the figure, the optical transmitter 10 of the related art used for optical duobinary transmission is provided with a code conversion circuit or "pre-coder" 11, a low-pass filter (LPF) 12, and a Mach-Zender optical modulator (MOD) 13.

The superhigh speed electrical input signal Ein to be transmitted is input through an inverter (INV) 14 to one input of the exclusive OR (EXOR) circuit 15 in the code conversion circuit (pre-coder) 11. The 1-bit delayed preceding EXOR output is fed back through a delay element (DLY) 16 to the other input of the EXOR circuit 15. This fed back output is EXORed with the signal Ein supplied to the one input and that EXOR output is input to the low-pass filter 12.

Figure 17:
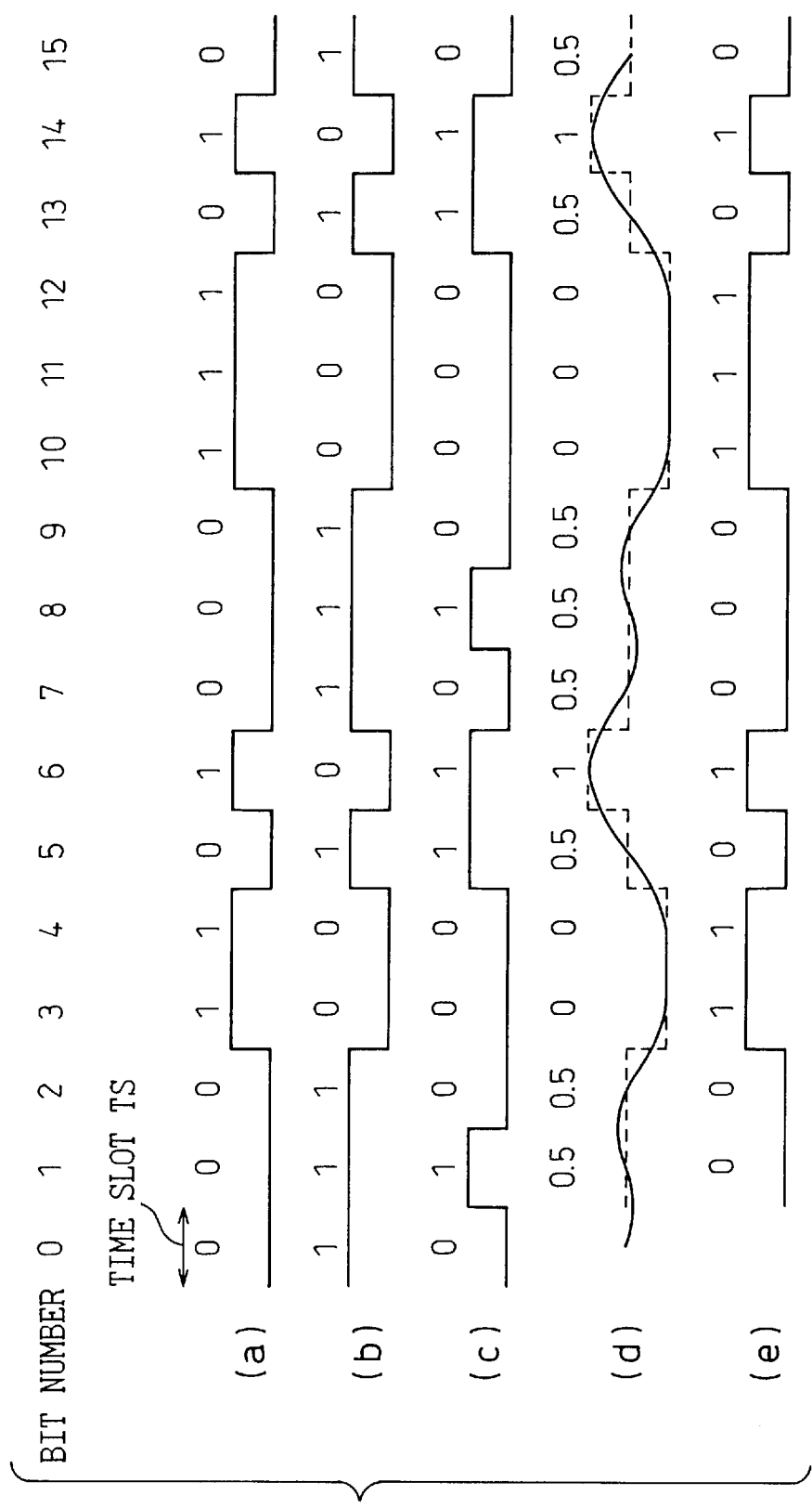
FIG. 17 is a time chart showing the signal waveforms at respective portions shown by a to e in FIG. 16.

FIG. 17 is a time chart showing the signal waveforms at respective portions shown by a to e in FIG. 16.

In the figure, the signal waveforms at the portions shown by a to e in FIG. 16 are shown in the rows (a) to (e). Further, the topmost row of the figure shows the consecutive bits forming the digital electrical input signal Ein as the bit numbers 01234 . . . The width of a bit corresponds to one time slot TS. That is, if the bit rate of the signal Ein is B, 1TS equals 1/B.

Referring to FIG. 16 and FIG. 17, first, assume that the digital electrical input signal Ein is supplied from a former stage signal processing unit (not shown) by a bit pattern as shown in row (a) for example.

The signal Ein of row (a) is inverted in polarity by the inverter 14 and becomes the signal shown in row (b) which is then input to the pre-coder (code conversion circuit 11).

In the pre-coder one bit signal shown in row (b) and the one bit signal obtained by delaying the one bit signal input immediately before by exactly the delay time Td at the delay element 16 are input to the EXOR circuit 15. The EXOR output appears with the bit pattern shown in row (c).

The binary signal shown in row (c) is input to the low-pass filter 12 and converted to the trinary signal (0, 0.5, 1) shown in row (d).

The trinary signal shown in row (d) is input to the Mach-Zender type optical modulator 13, converted to a binary optical signal and launched to the optical fiber F. The binary optical signal enables high dispersion tolerance optical duobinary transmission. This will be explained in more detail below.

When the n-th bit signal in row (b) is Bn, the n-th bit signal in row (c) is Cn, and the signal one bit before Cn is C(n−1), the following equation (1) stands:

$$Cn = Bn + C(n-1) \bmod 2 \quad (1)$$

If the above signal Cn is passed through the low-pass filter 12, it becomes the signal shown in row (d). When the n-th bit signal in row (d) is Dn, this Dn can be expressed as shown by the following equation (2):

$$Dn = \{Cn + C(n-1)\}/2 \quad (2)$$

Here, the band of the low-pass filter 12 is set to ¼ of the bit rate B of the input signal Ein, that is, 0.25B.

If the signal is input to the low-pass filter 12 of a narrow band of ¼ of the bit rate B, it is smoothed in signal waveform and becomes the trinary signal (0,0.5,1) shown by the solid line in row (d).

If the above trinary signal (0,0.5,1) is input to the Mach-Zender type optical modulator 13, it is again converted to a binary optical signal (optical signal of row (e)). At the 0.5 of the trinary signal, the binary optical signal becomes 0, while at the 0 of the trinary signal, the binary optical signal becomes 1. Even at the 1 of the trinary signal, the binary optical signal becomes 1. In this case, the optical power of the binary optical signal at 0 of the trinary signal becomes the maximum "1". The optical power of the binary optical signal at the 1 of the trinary signal also becomes the maximum "1". The former optical signal at the time of the maximum optical power and the latter optical signal at the time of the maximum optical power, however, are shifted from each other in phase by 180°. Note that the optical power of the binary optical signal 0.5 of the trinary signal becomes substantially zero.

This binary optical signal, that is, the optical output signal Oout of FIG. 16, is narrowed in spectral bandwidth since the band of the binary signal from the filter 12 is reduced to ¼ of the bit rate B. By launching the optical output signal Oout reduced in spectral bandwidth in this way and transmitting it over the optical fiber F, high dispersion tolerance optical transmission becomes possible. This is optical duobinary transmission.

TABLE

| C(n−1) | Cn | An | Dn |
|---|---|---|---|
| 0 | 0 | 1 | 0 |
| 0 | 1 | 0 | 0.5 |
| 1 | 0 | 0 | 0.5 |
| 1 | 1 | 1 | 1 |

The above table shows the state of binary/trinary conversion by the low-pass filter 12. C(n−1), Cn, and Dn are as explained above. An is the bit value of the electrical input signal Ein shown in row (a).

The trinary signal output from the filter 12 as Dn of the above table becomes a binary optical signal at the optical modulator 13 and appears at the output of the optical modulator 13 as light emission or non-light emission. Specifically, when Dn=0 or Dn=1, light is emitted, while when Dn=0.5, light is not emitted. In the final analysis, light is emitted at An=1 and light is not emitted at An=0. A bit pattern exactly the same as the bit pattern of row (a) is obtained as shown in row (e).

Even if the bit pattern (a) of row (a) is input and binary/trinary conversion by the filter 12 is interposed until the bit pattern (e) of row (e) is obtained, it is necessary to make the bit pattern (a) and the bit pattern (e) match. What is provided for this is the above pre-coder (code conversion circuit 11). That is, if a pre-coder is not provided, the input bit pattern and output bit pattern of the optical transmitter 10 will not match. The code conversion circuit 11 does not have to be provided in the optical transmitter 10 and may be provided in the later mentioned optical receiver as a decoder (post-decoder). In the latter case, a pattern exactly the same as the above bit pattern (a) is reproduced when going through the decoder on the optical receiving side. The present invention relates to the above pre-coder and decoder, but the explanation will mainly be made of a pre-coder.

Figure 18:
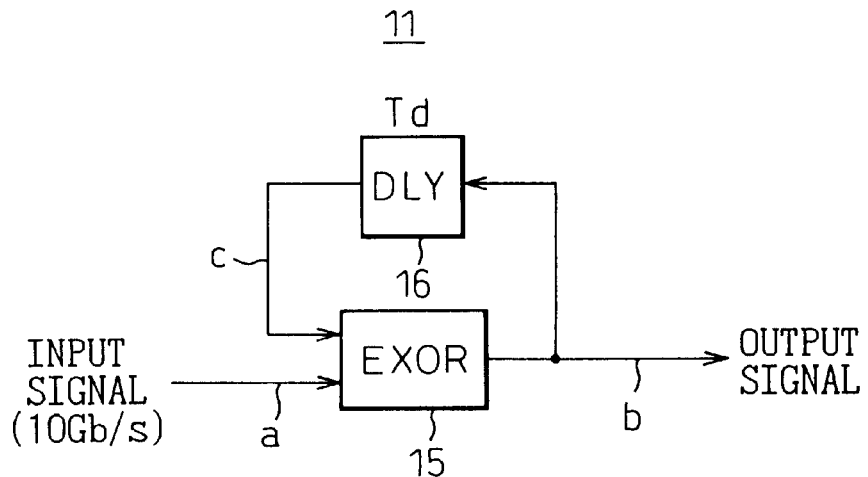
FIG. 18 is a view of a first example of a code conversion circuit (pre-coder) of the related art.

FIG. 18 is a view of a first example of a code conversion circuit (pre-coder) of the related art. The code conversion circuit 11 is exactly the same as that illustrated in FIG. 16.

Figure 19:
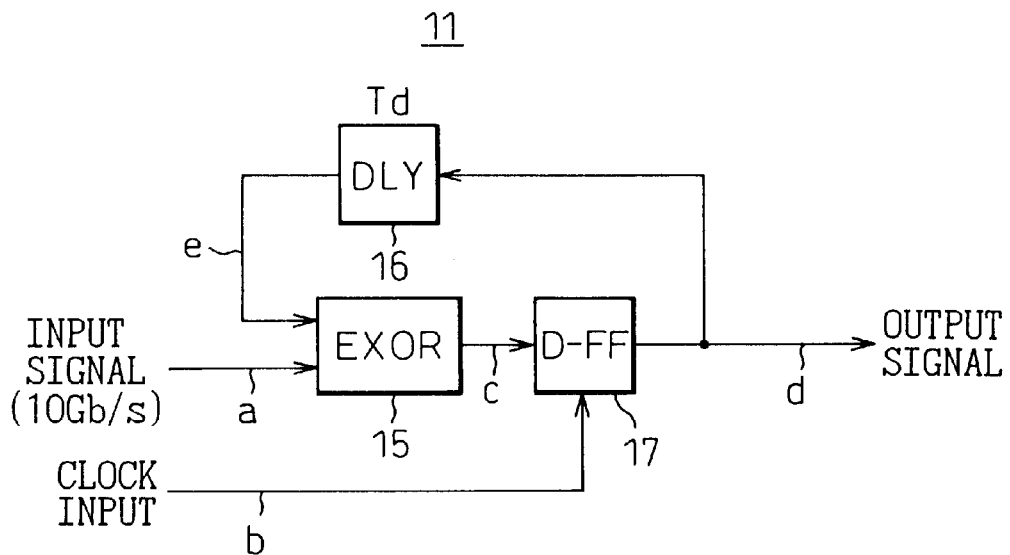
FIG. 19 is a view of a second example of a code conversion circuit (pre-coder) of the related art.

FIG. 19 is a view of a second example of a code conversion circuit (pre-coder) of the related art. This second example of a pre-coder can solve the later explained disadvantage of the first example of the pre-coder shown in FIG. 18 and is characterized by the provision of the D-FF circuit 17.

Figure 20:
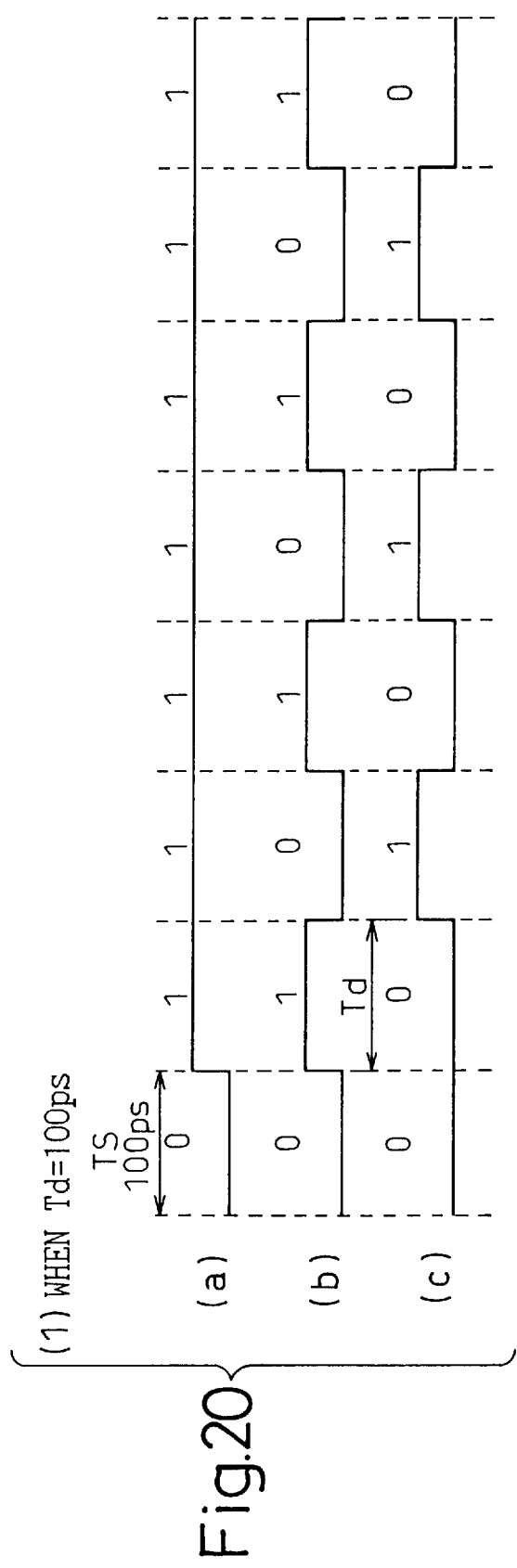
FIG. 20 is a time chart of the operation of the pre-coder (first example) shown in FIG. 18.
Figure 21:
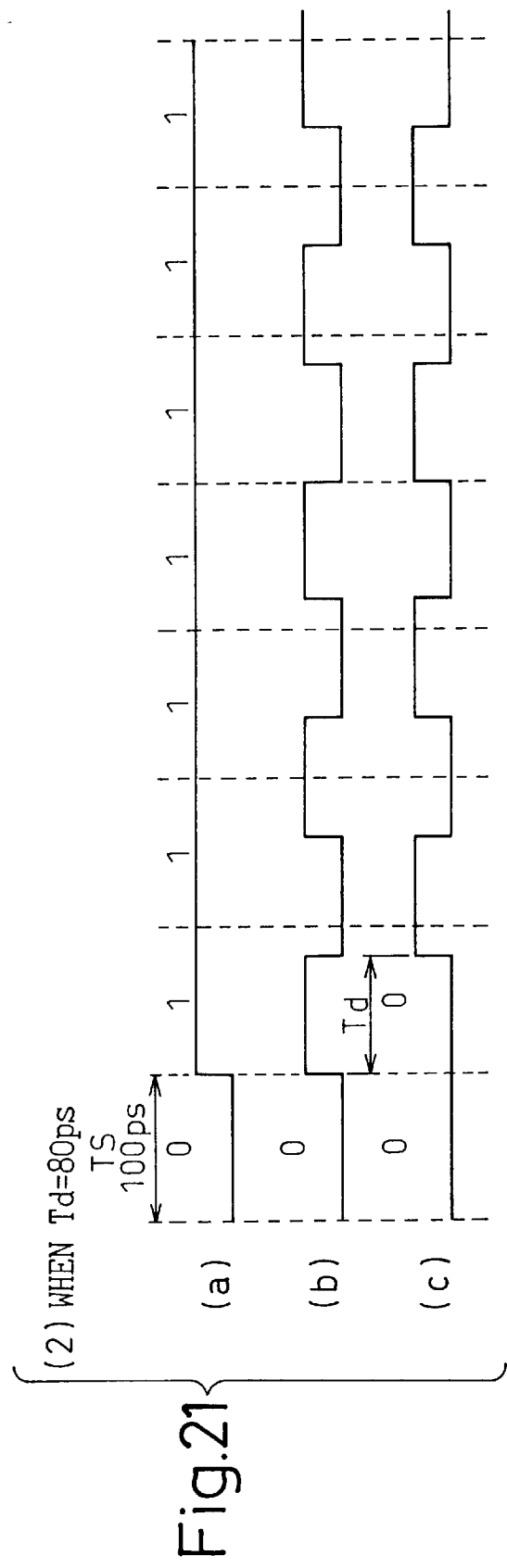
FIG. 21 is a time chart of the operation in the pre-coder (first example) shown in FIG. 18 when the delay time is off from one time slot.

FIGS. 20 and 21 are time charts of the operation of the pre-coder (first example) shown in FIG. 18.

Referring to FIG. 20, the time chart shows the operation when the delay time Td of the delay element 16 matches one time slot (TS) exactly, that is, Td=100 ps, when the pre-coder (code conversion circuit 11) of FIG. 18 receives an input signal of 10 Gb/s. Note that the rows (a) to (c) of FIG. 20 show the waveforms of the signals appearing at the corresponding portions a to c in FIG. 18.

Referring to FIG. 18 and FIG. 20, assume that, as the 10 Gb/s input signal, for example, a signal of a bit pattern of 0111 . . . shown in row (a), is received.

The input signal of row (a) is EXORed with the input signal of row (c) one time slot TS before by the EXOR circuit 15 to obtain the output signal of row (b).

However, the above input signal of one time slot TS before is not always fed back to the EXOR circuit 16 with a delay of precisely 100 ps. The reason is that the delay element 16 includes a propagation delay etc. of the EXOR circuit 15 itself and, further, there are also the effects of temperature fluctuations etc.

The time chart of FIG. 21 shows the operation in the case where the delay time Td due to the delay element 16 becomes off from one time slot (TS=100 ps), in this example, is shorter than the time slot TS such as the delay time Td being 80 ps.

Therefore, as shown in row (c) of the figure, the input signal one time slot TS before to be fed back to the EXOR circuit 15 ends up being fed back at a time 20 (=100−80) ps earlier than the one time slot TS time (=100 ps). As a result, the output signal of row (b) appearing later becomes a bit pattern completely different from the output signal shown in row (b) of FIG. 20. This is the disadvantage in the first example of the pre-coder of the related art.

This disadvantage can be eliminated by the conventional second example of the pre-coder (FIG. 19).

Figure 22:
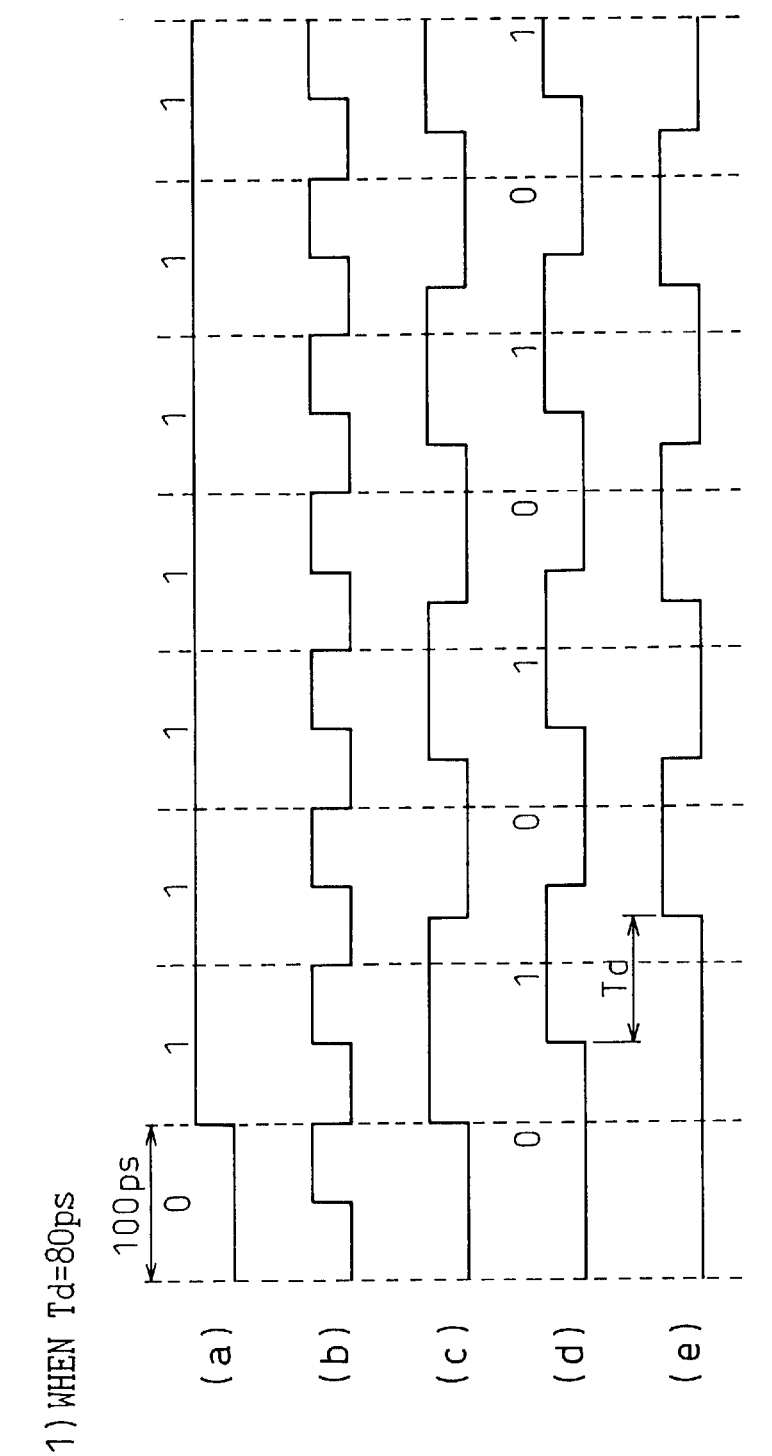
FIG. 22 is a time chart of the operation in the pre-coder (second example) shown in FIG. 19.
Figure 23:
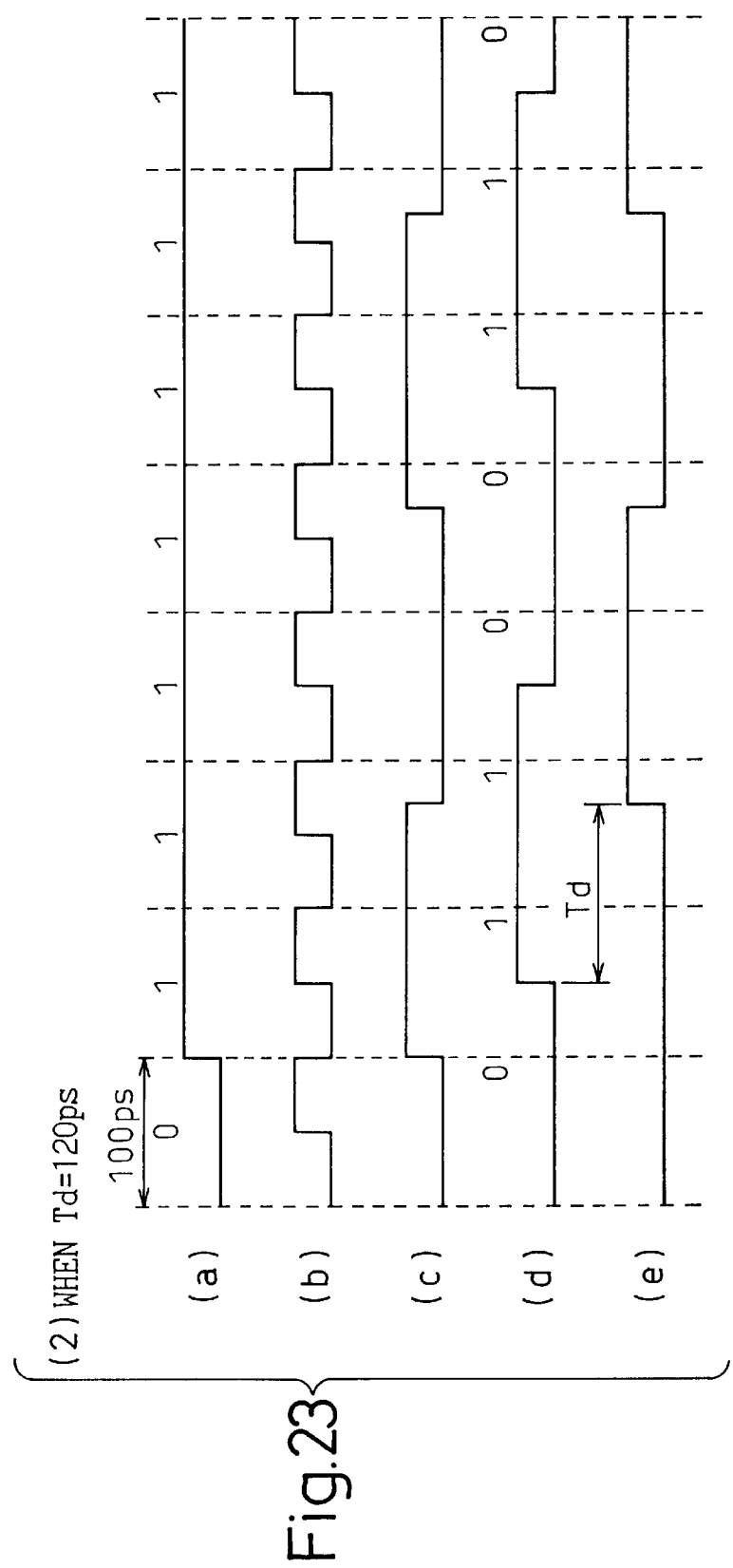
FIG. 23 is a time chart of the operation in the pre-coder (second example) shown in FIG. 19 when the delay time is off from one time slot.

FIGS. 22 and 23 are time chart of the operation in the pre-coder (second example) shown in FIG. 19.

First, referring to FIG. 22, when the delay time Td is shorter than one time slot TS (=100 ps), for example, is 80 ps, the signal of row (e) changes in bits at the time when 80 ps have elapsed from the signal of row (d). Responding to this bit change, the signal of row (c) ends up changing in bits at an earlier time than the signal of row (c). Up to here, the same is true as in the case of FIG. 21.

This pre-coder (second example), however, has a D-FF circuit 17 between the EXOR circuit 15 and the delay element 16.

Due to the D-FF circuit 17, despite the occurrence of the bit change of the signal at a time earlier than 20 (=100−80) ps as shown in row (c) of FIG. 22, a bit change occurs in the signal at the next arriving clock (row (b)) as shown in row (d), so there is no effect by the offset of the delay time Td (80 ps) relative to one time slot TS (100 ps).

There is however a problem in the pre-coder (second example). This problem occurs in the case where the above delay time Td becomes longer than one time slot TS (100 ps), for example, 120 ps.

Referring to FIG. 23, due to the delay time Td (120 ps) being longer than one time slot TS (100 ps), the bit change (0→1) of the signal of row (e) becomes delayed. Along with this, the bit change (1→0) of the signal of row (c) also ends up being delayed. This happening, at the sampling timing of the D-FF circuit 17 by the clock input (b), the signal of row (c) continues to hold the "1" state despite it having to change from "1" to "0" as shown in row (c) of FIG. 22. Therefore, the signal of row (c) remaining "1" by the clock input is sampled and, in the end, the bit-changed signal as shown in row (d) ends up being output from the pre-coder. The bit pattern of the signal of row (d) becomes completely different from the bit pattern of the normal case (row (d) of FIG. 22). This is the problem.

In the end, this pre-coder (second example), however, operates normally when the delay time Td at its delay element 16 is shorter than one time slot TS, but no longer operates normally when the Td is longer than one time slot TS. In the above explanation, the example was shown of 10 Gb/s, but in superhigh speed optical transmission, 20 Gb/s or 40 Gb/s speeds will be realized in the future. When this happens, one time slot TS will become further shorter, that is, 50 ps or 25 ps. Even if improvements in IC process technology raise the maximum operating speed and enable the circuit delay to be made smaller, the delay time due to the wirings etc. will remain unchanged. Therefore, the ratio of the delay time due to the wirings in the total delay time Td will become larger as the time slot TS becomes shorter and it will become more difficult to make the delay time Td shorter than the time slot TS. When this happens, normal operation of the pre-coder will no longer be able to be ensured, as explained before with reference to FIG. 23.

The present invention was made in consideration of the above problems and provides a code conversion circuit in an optical transmitter or optical receiver for superhigh speed transmission which ensures normal operation even if including a delay element with a delay time exceeding the time of one time slot of an input signal.

Figure 1:
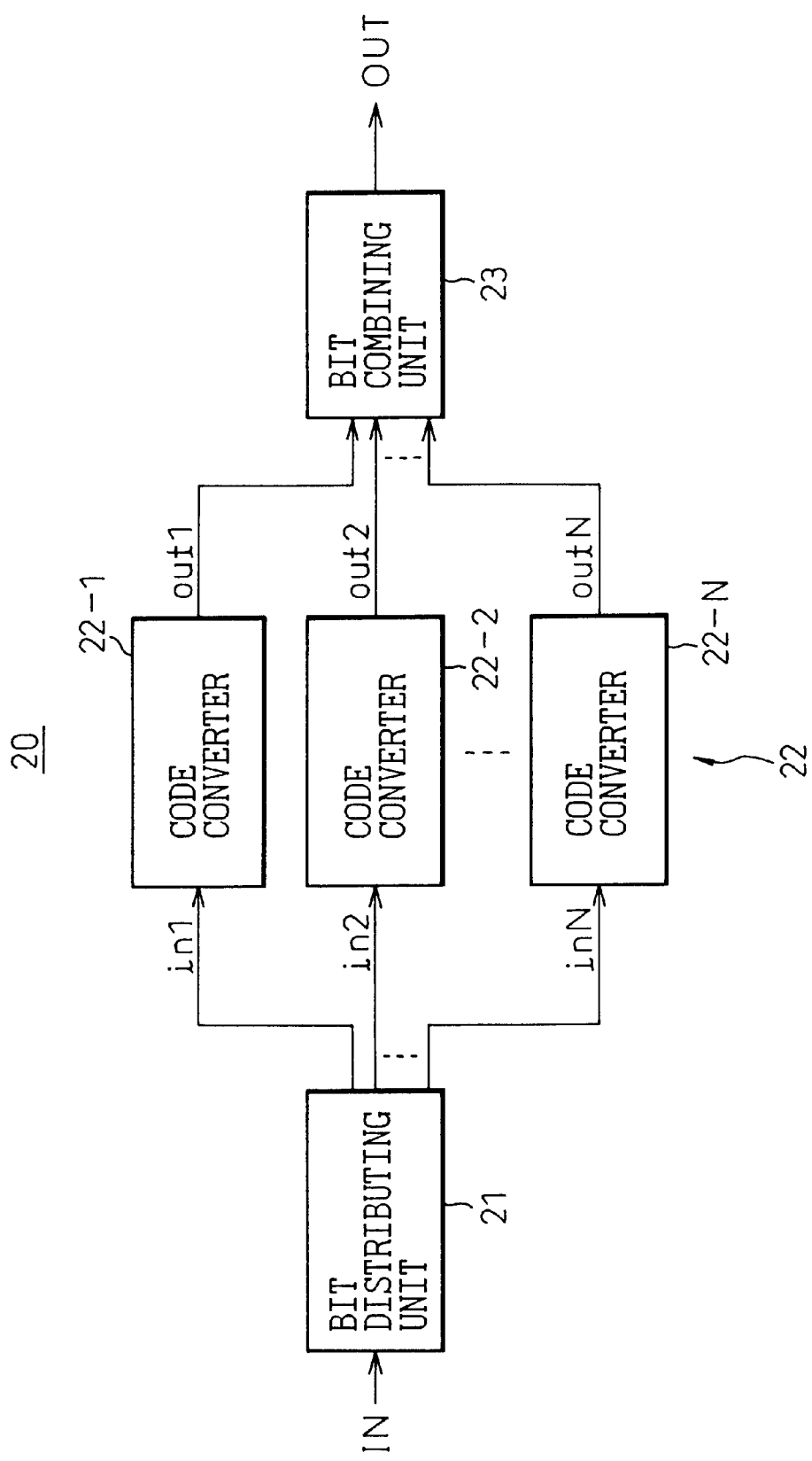
FIG. 1 is a view of the basic configuration of a code conversion circuit (coder circuit) according to the present invention.

FIG. 1 is a view of the basic configuration of a code conversion circuit (coder circuit) according to the present invention.

In the figure, the code conversion circuit 20 for optical duobinary transmission according to the present invention is comprised of a bit distributing unit 21, code converters 22, and a bit combining unit 23. The code converters 22 include a plurality of code converters 22-1, 22-2, . . . 22-N. N is an integer of 2 or more.

The bit distributing unit 21 receives a high speed input signal IN and divides it into N ways of low speed signals in (in1, in2 . . . ) shifted in bit phase from each other.

The N number of code converters 22-1, 22-2, . . . 22-N are provided corresponding to the distributed N ways of low speed signals in (in1, in2 . . . ). The code converters perform code conversion on the corresponding low speed signals.

The bit combining unit 23 receives as input the N ways of code-converted low speed signals out (out1, out2 . . . ) output from the N number of code converters 22-1 to 22-N and logically processes and combines the low speed signals out (out1, out2 . . . ) to produce the code-converted high speed output signal OUT.

The point of the present invention lies in the N number of code converters 22-1 to 22-N divided in parallel. These code converters have the same configuration. Specifically, they may be configured the same as the configuration of FIG. 18 (first example of related art) or FIG. 19 (second example of related art). In the following explanation, the example is taken of use of the configuration of the second example of the related art (FIG. 19) improved from the first example of the related art.

In the code conversion circuit 11 according to the second example of the related art, as explained above, when the delay time Td becomes longer (for example, Td=120 ps) than one time slot TS (100 ps at 10 Gb/s), normal operation is no longer possible. That is, in the code conversion circuit of the related art, when the above figures are used, it is necessary to strictly restrict Td to less than 100 ps. As explained above, however, it is difficult to hold this restriction at all times. There is therefore a strong demand to ease this restriction.

Referring again to FIG. 1, in the code conversion circuit 20 according to the present invention, N number of pre-coders (or decoders), each comprised of an EXOR circuit 15, a delay element 16 (often not existing as actual element) and a D-FF circuit shown in FIG. 19, are provided in parallel. Considering the case where N=2 and the above example, the strict restriction of the delay time Td having to be less than 100 ps at all times is tremendously eased to the restriction of keeping Td less than 200 ps. If N=4, the restriction is eased to keeping it less than 400 ps.

The restriction is eased in this way since the code converters 22-1 and 22-2 (in case of N=2) may operate with the input of low speed signals in (in1, in2) of 5 (=10/2) Gb/s. Since one time slot TS of an input signal of 5 Gb/s is 200 ps, any of the code converters (22-1, 22-2) is allowed to have a delay time Td of up to 200 ps.

However, the above bit distributing unit 21 becomes necessary at the input side for reducing the high speed input signal IN to the N ways of low speed signals in. On the other hand, a bit combining unit 23 becomes necessary at the output side for restoring them to a high speed output signal OUT. The N ways of low speed signals in (in1, in2 . . . ) are individually code-converted without any interaction at all, so it is necessary to logically process the N ways of code converted low speed signals in and use the result of the logical process to obtain the high speed output signal OUT. This logical processing is specifically an EXOR operation. Referring to FIG. 18 and FIG. 19, an EXOR operation is performed between the presently input signal and the signal in put one bit before, but such an EXOR operation with the 1-bit preceding feedback input signal is not considered in any of the N number of code converters 22-1 to 22-N shown in FIG. 1. Therefore, the EXOR operation between the presently input signal and the 1-bit preceding feedback input signal is performed all together and the desired high speed output signal OUT put together at the final bit combining unit 23. This is the basic function of the bit combining unit 23.

Figure 2:
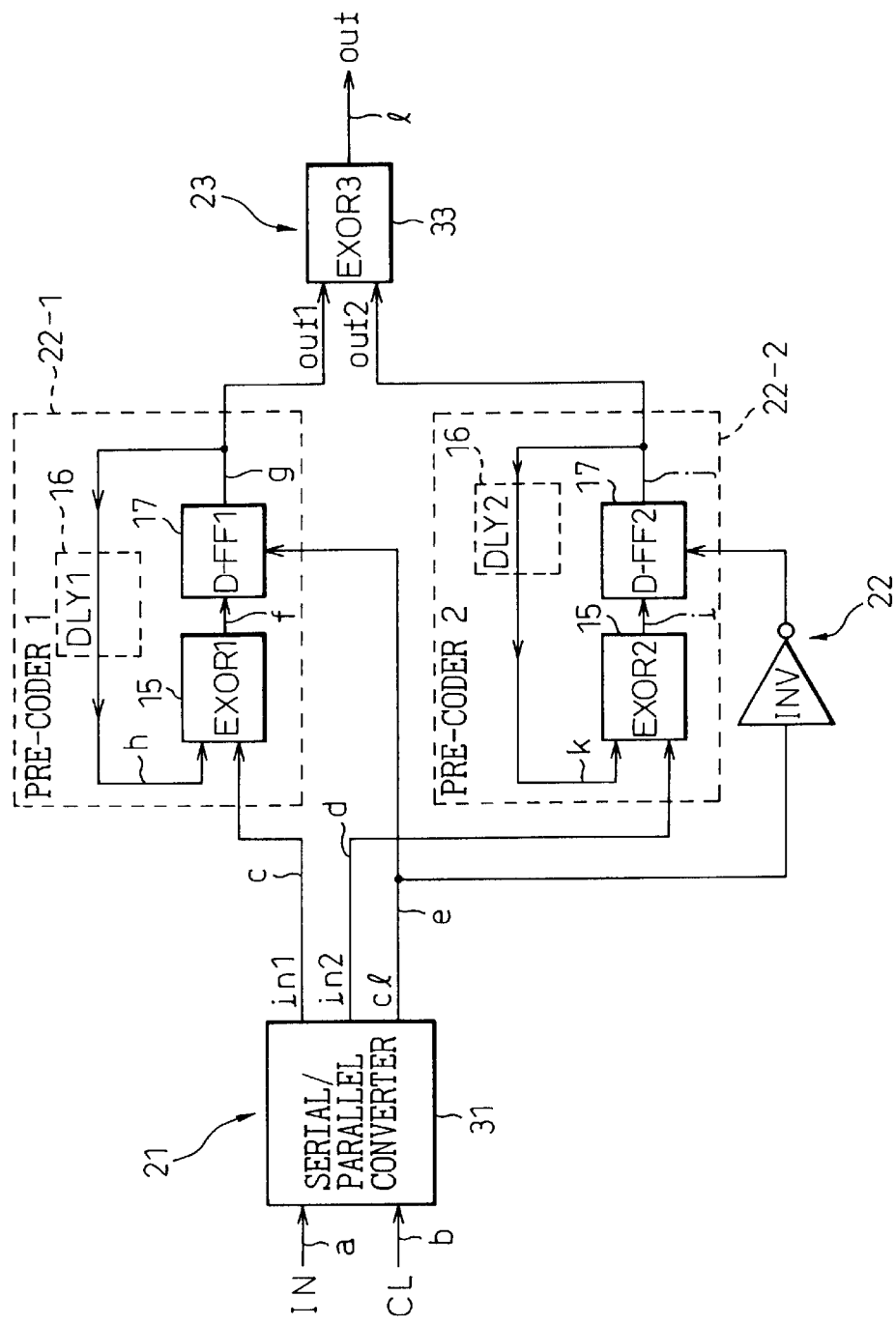
FIG. 2 is a view of a concrete example of a code conversion circuit (coder circuit) according to a first embodiment of the present invention.

FIG. 2 is a view of a concrete example of a code conversion circuit (coder circuit) according to a first embodiment of the present invention. Note that the same components are given the same reference numerals or symbols throughout the drawings. Further, the first embodiment is explained with reference to N=2.

The above bit distributing unit 21 is comprised of a serial/parallel converter 31 which receives the high speed input signal IN and a high speed clock CL synchronized with the high speed input signal IN and outputs two ways of low speed signals in1 and in2 and a low speed clock cl obtained by dividing the clock CL by 2.

The first low speed signal in1 is input to the first code converter 22-1 represented by the pre-coder 1. The code converter 22-1 operates by the low speed clock cl.

Further, the second low speed signal in2 is input to the second code converter 22-2 represented by the pre-coder 2. The code converter 22-2 operates by a low speed clock cl phase inverted by the inverter INV.

The code-converted low speed signals out1 and out2 output from the first and second code converters 22-1 and 22-2 are input to the above bit combining unit 23. The bit combining unit 23 is comprised of an EXOR circuit 33 which produces the high speed output signal OUT and sends it to the already explained low-pass filter 12.

The code converters (22-1, 22-2) include EXOR circuits 15 which produce EXOR outputs of the corresponding low speed signals (in1, in2) and delayed 1-bit preceding fed back low speed signals.

The code converters (22-1, 22-2) are further provided with D-FF circuits 17 which are connected to the output sides of the EXOR circuits 15 and produce delayed 1-bit preceding fed back low speed signals.

The D-FF circuits 17 operate by the corresponding one of the N (N=2) number of low speed clocks cl obtained by dividing the high speed clock CL synchronized with the high speed input signal IN by N (N=2) and shifted in phase from each other.

Figure 3:
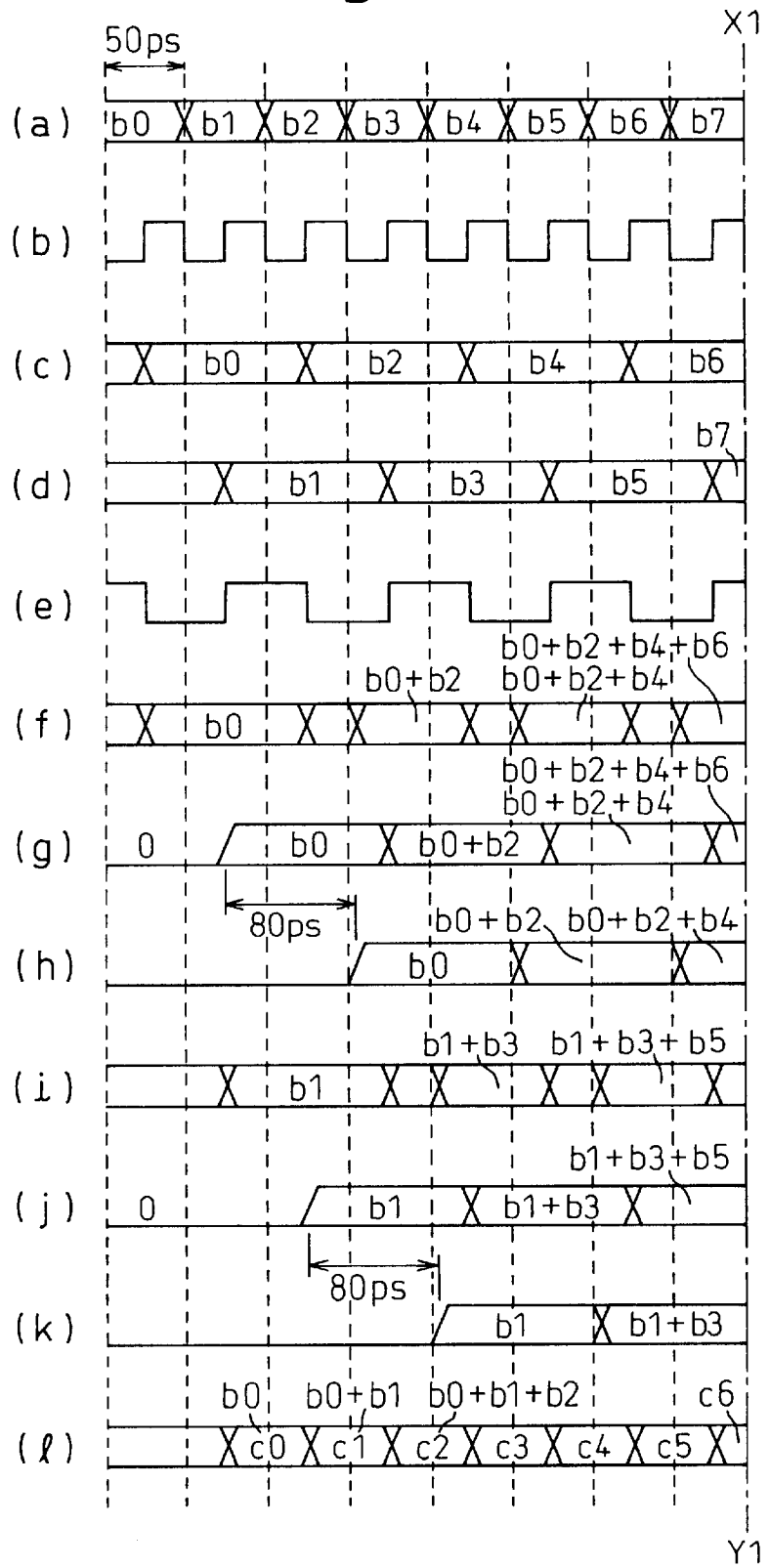
FIG. 3 is a first part of a time chart showing a signal pattern appearing at parts (a to l) of the circuit of FIG. 2.
Figure 4:
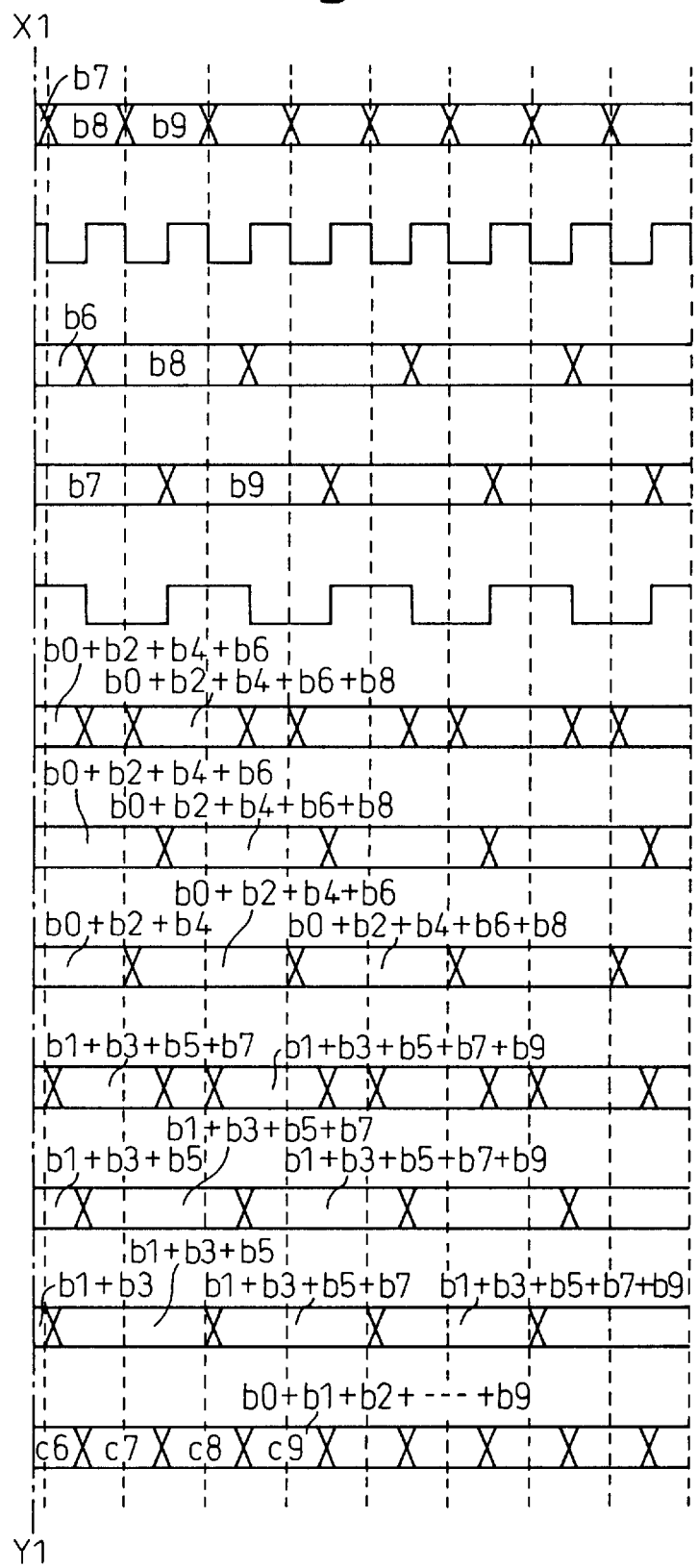
FIG. 4 is a second part of a time chart showing a signal pattern appearing at parts (a to l) of the circuit of FIG. 2.

FIG. 3 and FIG. 4 are parts of a time chart showing a signal pattern appearing at portions (a to l) of the circuit of FIG. 2.

The time chart of FIG. 3 and FIG. 4 shows an example of an input signal IN of 20 Gb/s further higher in speed than the above 10 Gb/s, as the high speed input signal IN. Therefore, one time slot becomes 50 ps (shown at top left in FIG. 3). The restriction on the delay time Td when code converting such a 20 Gb/s signal IN becomes less than 50 ps in the related art, but according to the present invention (FIG. 2) can be eased to less than 100 (=50×2) ps. This is clear from the time chart of FIG. 3 and FIG. 4.

The 20 Gb/s high speed input signal IN, as shown in row (a), is given as the bits b0, b1, b2, b3 . . . to the serial/parallel converter 31.

The clock CL synchronized with the high speed input signal IN is shown in row (b).

In the serial/parallel converter 31, the bit string b0, b1, b2, b3 . . . forming the high speed input signal IN is for example alternately distributed to perform serial/parallel conversion and produce a first low speed signal in1 of bits b0, b2, b4 . . . and a second low speed signal in2 of bits b1, b3, b5 . . . This is shown in rows (c) and (d). What should be noted here is that the time slots of the low speed signals in1 and in2 shown in rows (c) and (d) are expanded two-fold (100 ps). Due to this, the above restriction on the delay time Td is eased to half in the code converters (22-1, 22-2).

In the serial/parallel converter 31, the high speed clock CL is converted to a low speed clock cl of ½ of that frequency. This is shown in row (e).

When the first low speed signal in1 is input to the code converter 22-1, it is processed in accordance with the low speed clock cl of row (e) and signals such as shown in the rows (f), (g), and (h) appear at the portions f, g, and h. At rows (f), (g), and (h), "b0+b2" shows the result of an EXOR operation between the presently input bit b2 and the 1-bit preceding bit b0 for the first low speed signal in1. Similarly, "b0+b2+b4" shows the result of an EXOR operation between the presently input bit b4 and the 1-bit preceding result "b0+b2".

Similarly, when the second low speed signal in2 is input to the code converter 22-2, the low speed clock cl of row (e) is processed in accordance with the clock inverted in phase of 180° by the inverter INV and signals such as shown in the rows (i), (j), and (k) appear at the portions i, j, and k. In the rows (i), (j), and (k), "b1+b3" shows the result of an EXOR operation between the presently input bit b3 and the 1-bit preceding bit b1 for the second low speed signal in2. Similarly, "b1+b3+b5" shows the result of an EXOR operation between the presently input bit b5 and the 1-bit preceding result "b1+b3".

The thus code-converted first and second low speed signals out1 and out2 may be logically added and combined at the EXOR circuit 33 to obtain a code-converted high speed output signal OUT comprised of the bit string c0, c1, c2 . . . as shown in row (1). The bit c1 corresponds to the above bit (b0+b1) (where+indicates an EXOR operation, same below), while the bit c2 corresponds to the above bit (b0+b1+b2). Below, for bits c3, c4 . . . as well, similarly a series of bits (b) are cumulatively EXORed. In the explanation of FIG. 2, the clock phase is shifted by the inverter INV, then the signals are processed at the EXOR circuit 33. However since the pre-coders 1 and 2 operate independently, there is no need to give a special phase difference to these and it is also possible to give the same clock and give when entering the EXOR circuit 33, a phase difference to the signal g or j in the figure.

In the example of FIG. 2, it was stated that the restriction of the delay time Td being less than 50 ps was eased to a restriction of 100 ps, but in the time chart of FIG. 3 and FIG. 4, the example is shown of the actual delay time Td being 80 ps (see 80 ps of rows (g) and (j)).

Referring to the above equation (1) again, equation (1) is changed to the following equations (3) and (4) by code conversion using the circuit 20 of FIG. 2. Equation (1) is the same as the already shown equation.

$$Cn = Bn + C(n-1) \bmod 2 \quad (1)$$

$$= Bn + \{B(n-1) + C(n-2)\} \bmod 2 \quad (3)$$

$$= \sum_{i=0}^{n} Bi + C \bmod 2 \quad (4)$$

(where C is the initial value of the output of the pre-coder).

The above equation (4) matches with the results (c0, c1, c2 . . . ) of row (1) in FIG. 3 and Fig. 4.

Looking at equation (4), the initial value C is determined by the initial values of the signals out1 and out2 in FIG. 2 which are the values of the header bits of row (g) and row (j) in FIG. 3 and FIG. 4. In the figures, these are "0" and "0". Whether the initial value becomes (0,0) or (0,1) etc. is determined by the status of the D-FF circuit 17, which changes by the timing of input of power to the pre-coder (22-1, 22-2), and is not determined unequivocally. Therefore, in the circuit 20 of the present invention, it is possible to provide a reset means for setting the initial value to (0,0).

Simulation was performed, when the initial value is a value other than (0,0), for example, (0,1), (1,0), etc.

Figure 5:
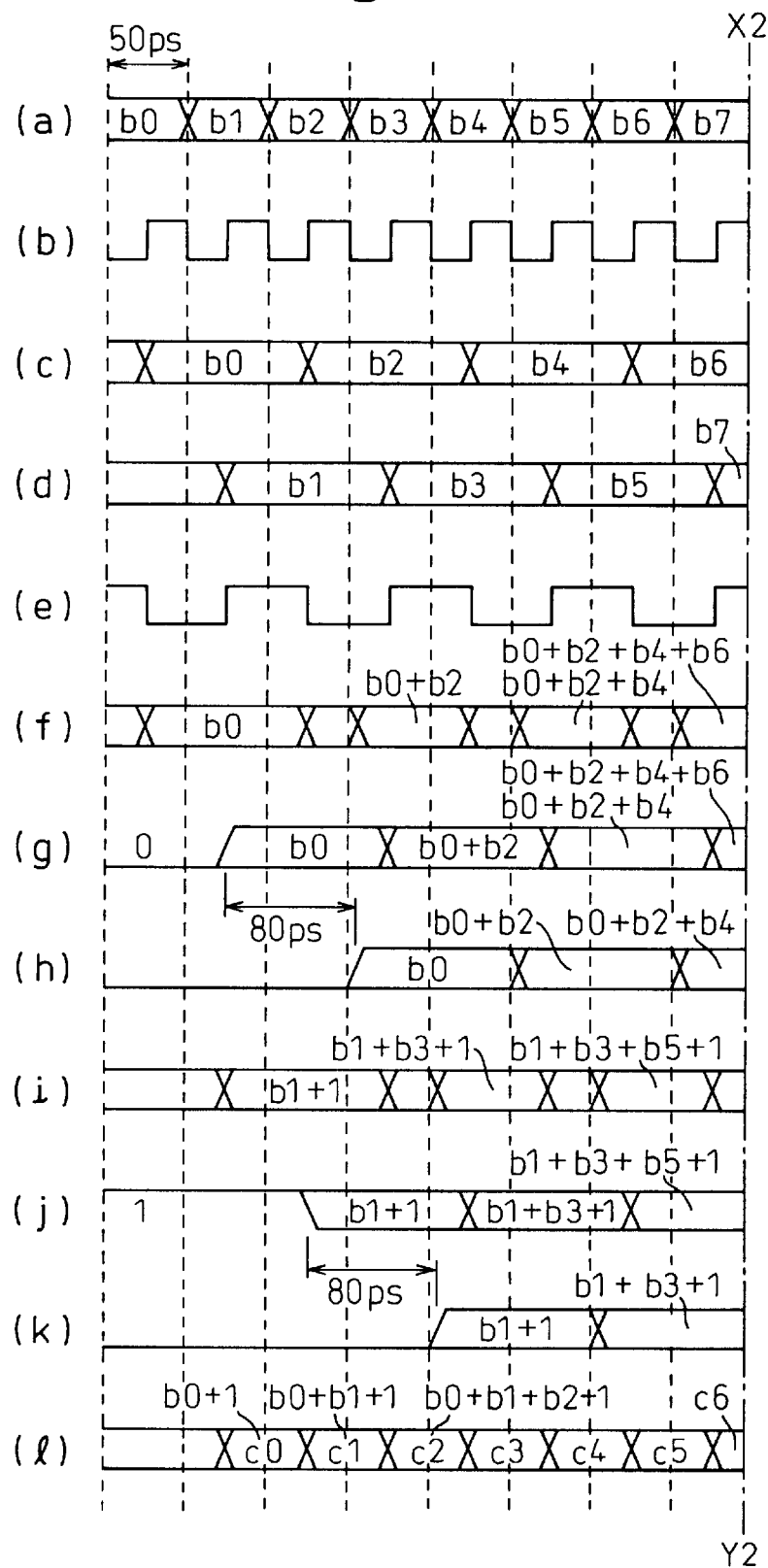
FIG. 5 is a first part of a time chart of the case when initial values different from the case of FIG. 3 and FIG. 4 are given.
Figure 6:
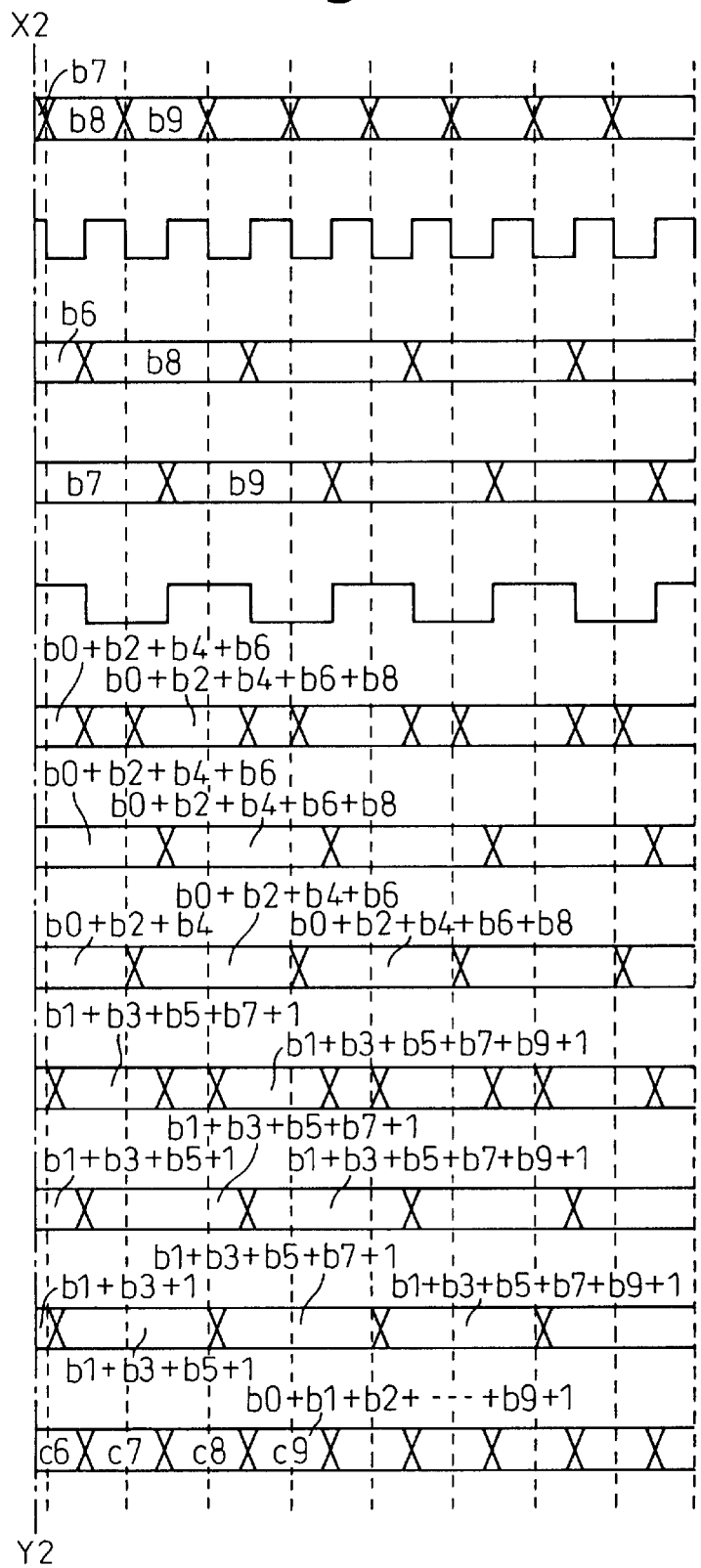
FIG. 6 is a second part of a time chart of the case when initial values different from the case of FIG. 3 and FIG. 4 are given.

FIGS. 5 and 6 show a time chart of the case when an initial value different from the case of FIG. 3 and FIG. 4 is given. Note that the time chart should be viewed in exactly the same way as the case of FIG. 3 and FIG. 4.

First, looking at the initial value of row (j) of FIG. 5, the "0" of row (j) of FIG. 3 is changed to "1". That is, the case is considered where the initial value (0,1) is given instead of the above initial value (0,0). This example corresponds to the case where the initial value of the pre-coder 2 is changed to "1". The change due to the change to "1" is represented as "+1" in row (i) and row (j) and appears as for example "b1+1", "b1+b3+1", . . . Finally, it appears as the "+1" shown in row (1). In the end, the bit string c0, c1, c2 . . . shown in row (1) of FIG. 3 and FIG. 4 becomes the bits c0+1, c1+1, c2+1, . . . shown in row (1) of FIG. 5 and FIG. 6.

As will be understood from the above table, however, when the electrical signal of row (1) is input to the Mach-Zender type optical modulator 13, the only difference when the modulated optical signal is the bit string c0, c1, c2 . . . and when it is the bit string c0+1, c1+1, c2+1 . . . is that the phase differs by 180° in the optical region. The "1" and "0" of the light are exactly the same between the two.

In the above example, the initial value was made (0,1), but due to the above reasons, both when the initial value is (1,0) and the initial value is (1,1), the target optical output signal Oout is obtained in the same way as the already explained initial value (0,0). Therefore, it is learned there is no need to first reset the initial value of the circuit 20 before operation.

Figure 7:
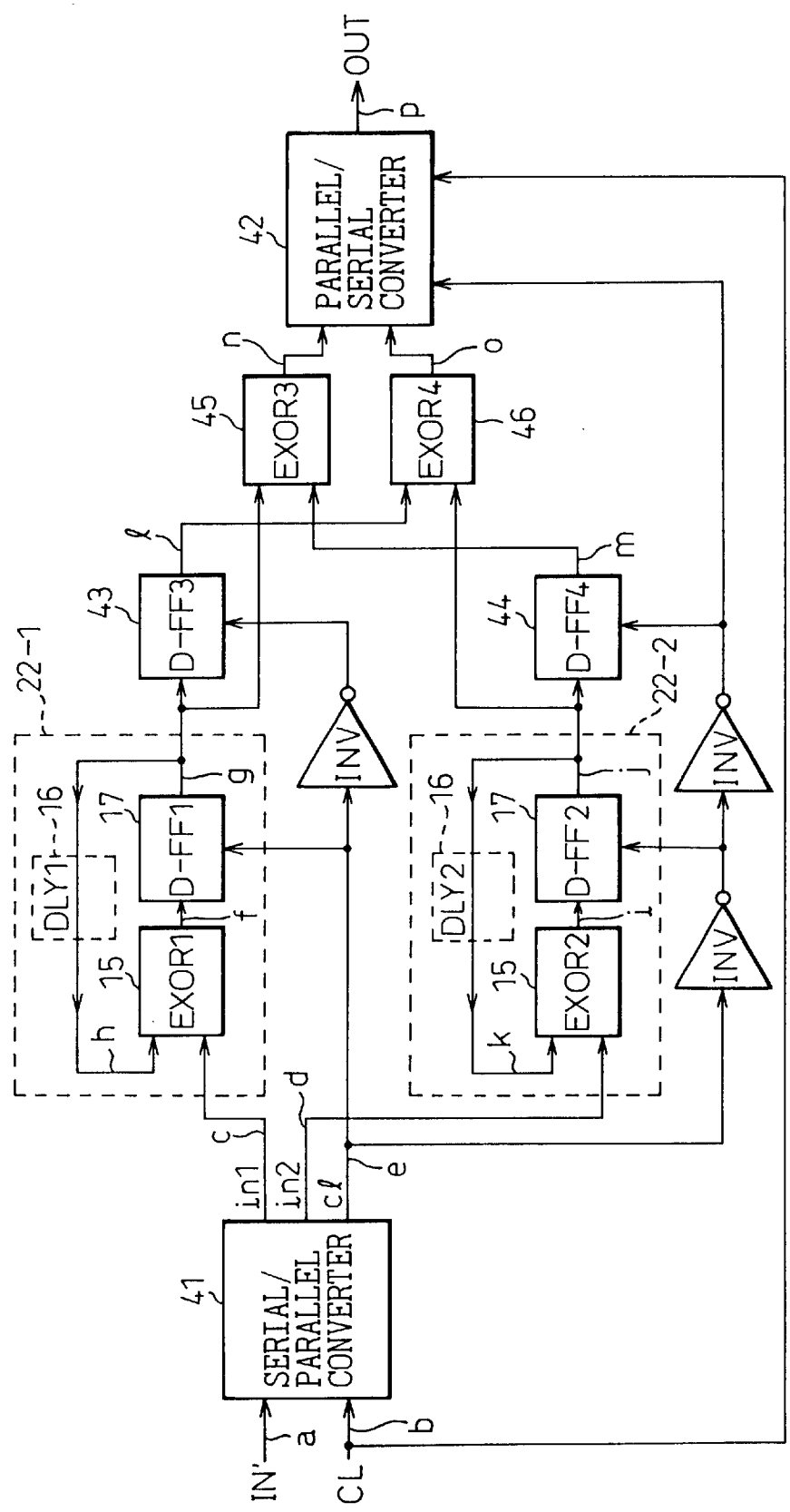
FIG. 7 is a view of a concrete example of a code conversion circuit according to a second embodiment of the present invention.

FIG. 7 is a view of a detailed example of a code conversion circuit according to a second embodiment of the present invention. This figure shows the case of N=2 in the same way as the first embodiment shown in FIG. 2.

In general, when looking at the optical output side as the configuration of the optical transmitter, the optical modulator 13 serving as the E/O converter, the low-pass filter 12, and the parallel/serial converter are often formed integrally on a single board. That is, the two way signals for example 20 Gb/s signals input in parallel to the parallel/serial converter is converted to, a 40 Gb/s signal at the parallel/serial converter. This 40 Gb/s signal is input through the low-pass filter 12 to the optical modulator 13. The code conversion circuit 20 shown in FIG. 7 is connected to the input side of the board.

This being so, by using commonly an existing parallel/serial converter at the input side of the board as the parallel/serial converter 42 of FIG. 2, there is no longer any need to raise the bit rate to the final bit rate (40 Gb/s in the above example) at the EXOR circuit 33 as in the case of the first embodiment (FIG. 2). Therefore, in the second embodiment of the present invention, the characteristic feature is that a parallel/serial converter 42 able to use an existing circuit (parallel/serial converter) is employed.

The above thinking can also be applied to the input side of the code conversion circuit 20. In the previous stage (not shown) connected to the input side of the code conversion circuit, there is an existing circuit (serial/parallel converter) for converting a high bit rate,signal to a low bit rate signal. Therefore, in the second embodiment, the serial/parallel converter 41 commonly using an existing serial/parallel converter is made part of the code conversion circuit 20.

The above thinking can also be applied to an optical receiver in an optical transmission system not provided with a pre-coder in the optical transmitter. In this case, the optical receiver provides a decoder functioning in a manner corresponding to the pre-coder. Further, the code conversion circuit 20 of FIG. 7 is adopted as the decoder.

In general, looking at the optical input side as the configuration of the optical transmitter, the O/E converter and serial/parallel converter are often formed integrally on one board. If the serial/parallel converter 41 made of an existing serial/parallel converter is used as part of the code conversion circuit 20, the above thinking can be realized. In the case of an optical receiver, however, the parallel/serial converter 42 becomes a dummy.

Figure 11:
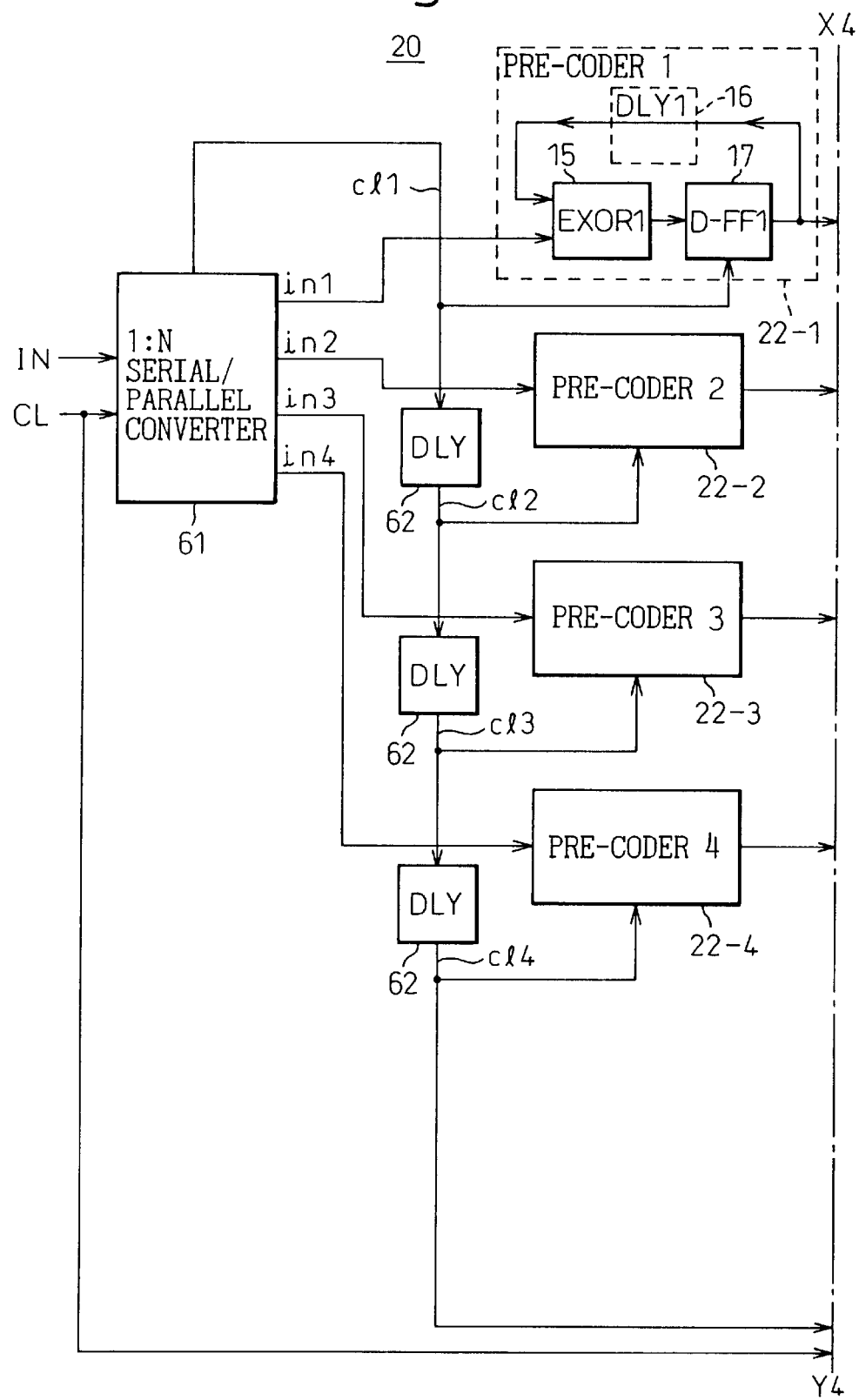
FIG. 11 is a first part of a view of the configuration of a code conversion circuit in the case where N is set larger than 2 based on the second embodiment of the present invention.
Figure 12:
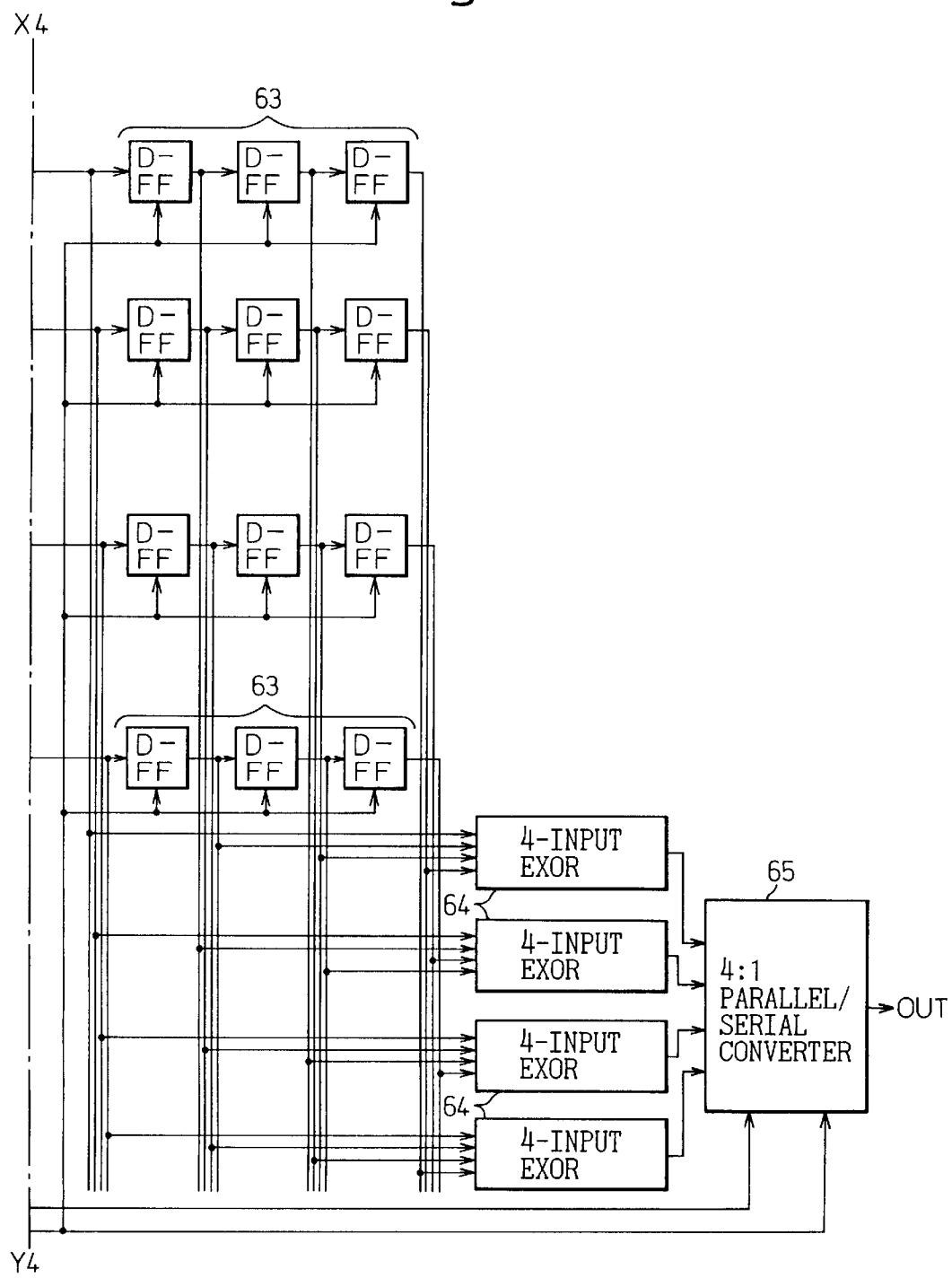
FIG. 12 is a second part of a view of the configuration of a code conversion circuit in the case where N is set larger than 2 based on the second embodiment of the present invention.

That is, referring to FIG. 11 and FIG. 12 showing a general configuration where N is larger than 2, the existing parallel/serial converter is commonly used as the N:1 parallel/serial converter 65 (in the figure, N=4) in the optical transmitter using, was pre-coders, the N number of code converters (22), the (N−1) number of delay units 63, and the N-input EXOR units 64.

Further, the existing serial/parallel converter is commonly used as the 1:N serial/parallel converter 61 in the optical receiver using, as decoders, the N number of code converters (22), the (N−1) number of delay units 63, and the N-input EXOR units 64.

In FIG. 7, the new components not shown in FIG. 2 are added for interfacing with the above parallel/serial converter 42, that is, the illustrated D-FF circuits 43 and 44 and the EXOR circuits 45 and 46.

In the second embodiment, since the existing parallel/serial converter 42 is used, it is necessary to match with the operation of the parallel/serial converter. The parallel/serial converter 42 merely performs the operation of the serial/parallel converter 31 of FIG. 2 in reverse. It merely alternately picks up the two-way bit strings which are input and arranges the bits in order at a high bit rate. This being done, it is necessary to obtain the EXOR in advance between the adjoining bits of the two-way bit strings which have no mutual interaction up to the serial/parallel converter 42. This is done by the EXOR circuit 45 and the EXOR circuit 46. At this time, the D-FF circuit 43 and the D-FF circuit 44 give a required phase shift to the bits input to the EXOR circuit 45 and EXOR circuit 46. The specific operation is shown by the time chart.

Figure 8:
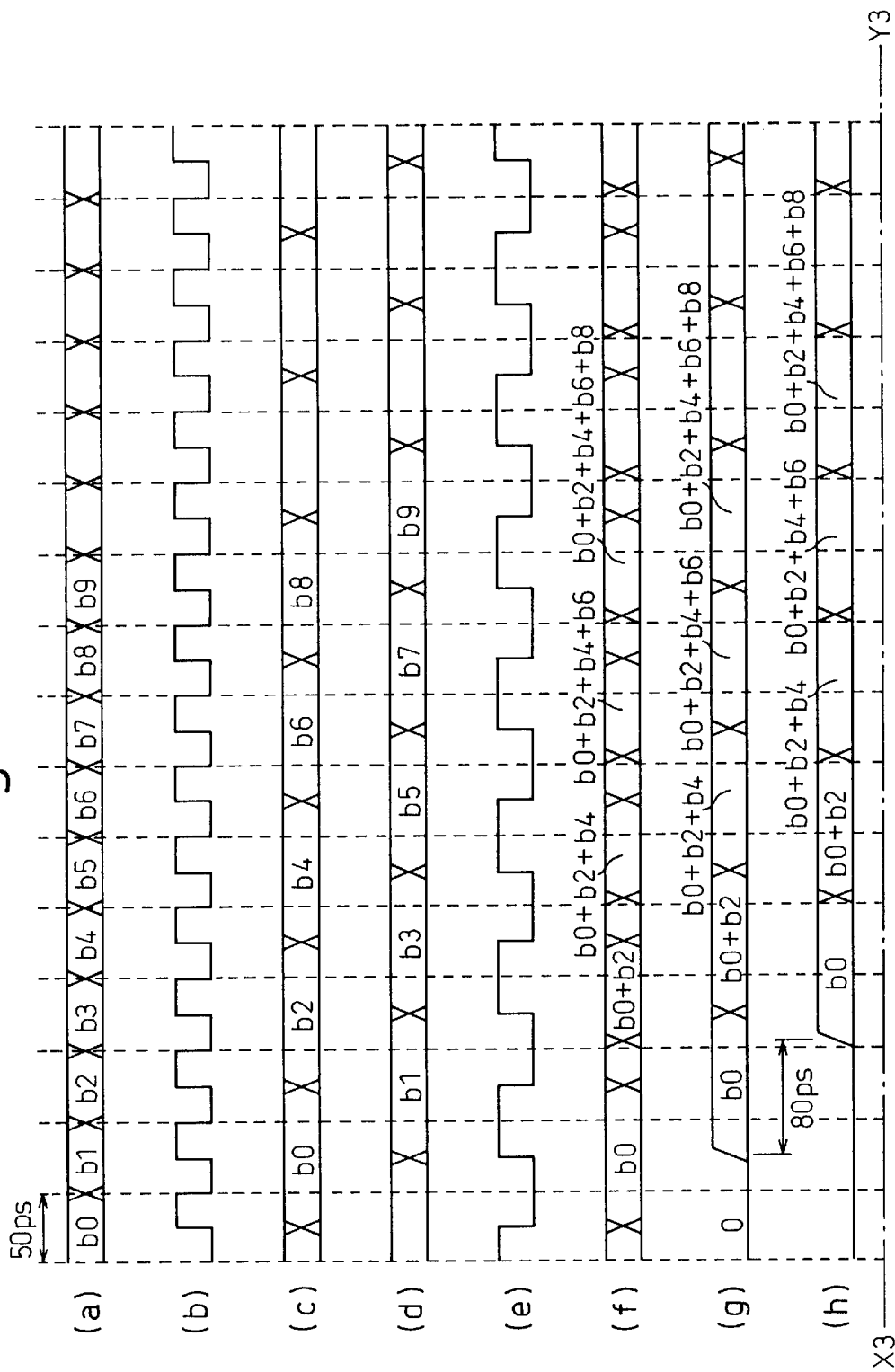
FIG. 8 is a first part of a time chart showing a signal pattern appearing at parts (a to p) of the circuit of FIG. 7.
Figure 9:
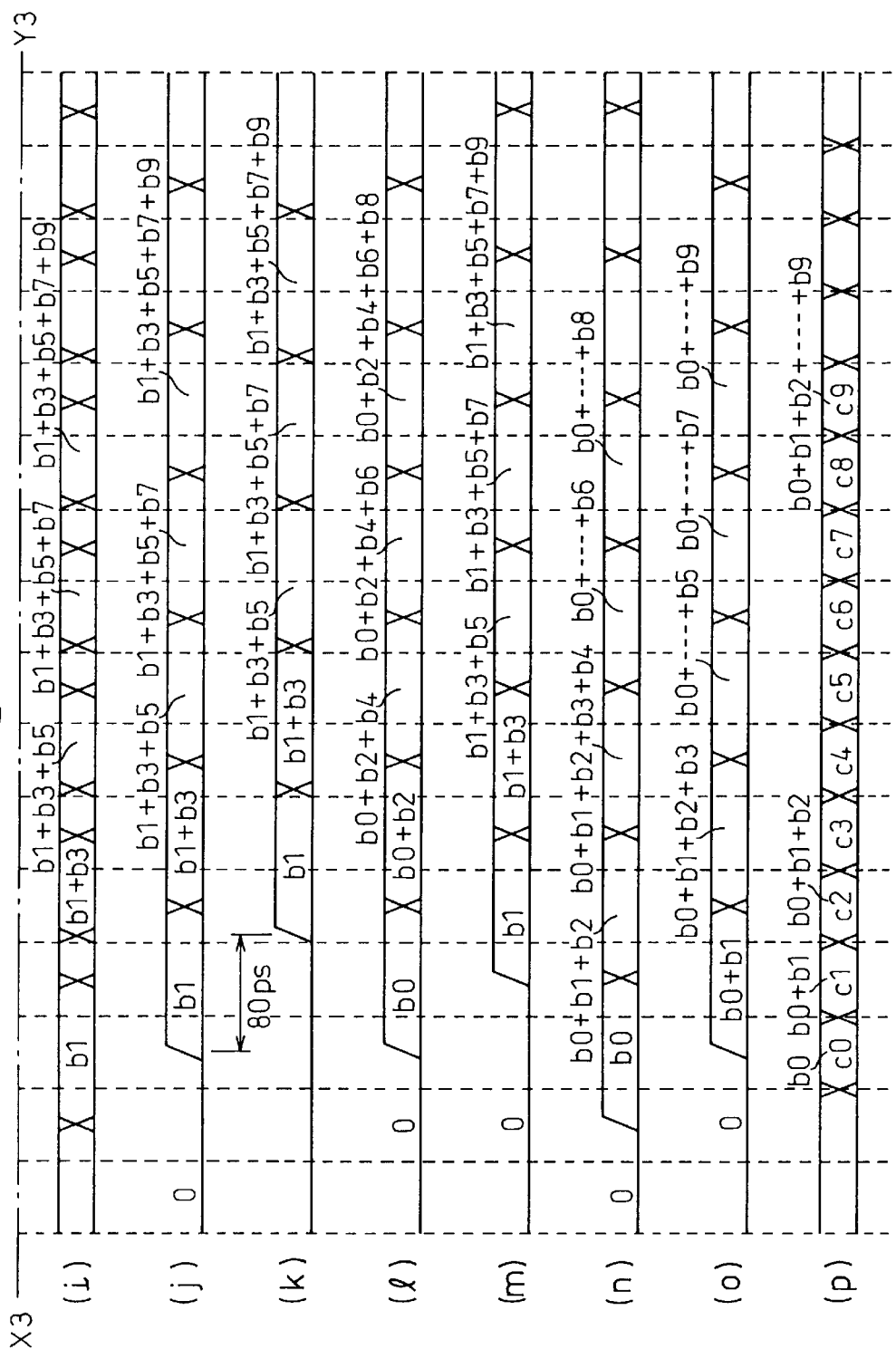
FIG. 9 is a second part of a time chart showing a signal pattern appearing at parts (a to p) of the circuit of FIG. 7.

FIGS. 8 and 9 are parts of a time chart showing a signal pattern appearing at portions (a to p) of the circuit of FIG. 7.

The time chart of FIG. 8 and FIG. 9 is viewed in the same way as FIG. 3 and FIG. 4.

Figure 10:
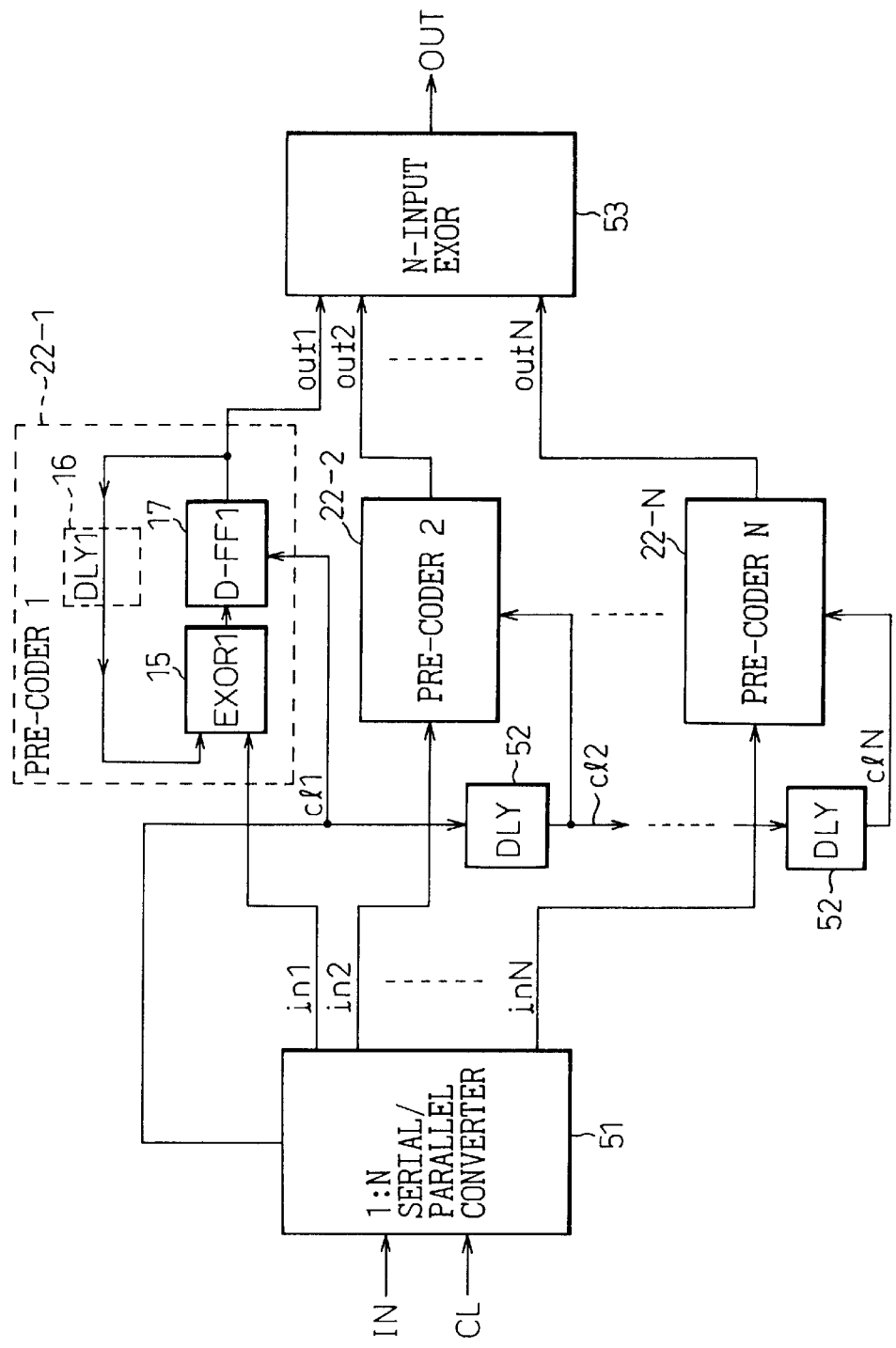
FIG. 10 is a view of the configuration of a code conversion circuit in the case where N is set larger than 2 based on the first embodiment of the present invention.

FIG. 10 is a view of the configuration of a code conversion circuit based on the first embodiment of the present invention in the case where N is set larger than 2. Note that the divisor N in the code conversion circuit 20 of the present invention may be made any integer of 2 or more, for example, N=2, 4, 6, 8, etc. Considering the signal speed and the delay resulting from the circuit etc., N is best 2.

The difference from the configuration of FIG. 2 is that the converter 31 of FIG. 2 becomes a 1:N serial/parallel converter 51, the EXOR circuit 33 of FIG. 2 becomes the N-input EXOR circuit 53, and there are (N−1) stage delay devices 52 connected in series for successively producing the phase shifted N number of low speed clocks (cl1 to clN).

Here, the serial/parallel converter 51 receives as input the high speed input signal IN and the high speed clock CL synchronized with the high speed input signal IN and outputs the serial/parallel converted and bit-phase shifted N ways of low speed signals in1 to inN and N number of low speed clocks (cl1 to clN) obtained by dividing the high speed clock by N and shifted in phase. The low speed clocks are received as input by the corresponding code converters 22-1 to 22-N.

FIGS. 11 and 12 are parts of a view of the configuration of a code conversion circuit based on the second embodiment of the present invention in the case where N is set larger than 2.

In FIGS. 11 and 12, a 1:N serial/parallel converter 61, N number of code converters 22-1 to 22-4, (N−1) stage delay units 63, N-input EXOR units 64, and an N:1 parallel/serial converter 65 are shown. In the figure, however, the case of N=4 is illustrated.

The 1:N serial/parallel converter 61 receives a high speed input signal IN serially and divides this in parallel to N (N shown by 4) ways of low speed signals in1 to in4.

The N number of code converters 22-1 to 22-N are provided corresponding to the N ways of low speed signals divided in parallel. The converters perform code conversion on the corresponding low speed signals.

The (N−1) stage delay units 63 are provided corresponding to the N number of code converters (22) and are connected in series for successively delaying the code-converted outputs from the code converters.

N-input EXOR units 64 are provided corresponding to the N number of code converters (22) and logically add the outputs from the code converters and the outputs from the (N−1) stage delay units 63 following the code converters.

The N:1 parallel/serial converter 65 combines the outputs from the N number of N-input EXOR units 64 corresponding to the N number of code converters (22) to produce the high speed output signal OUT.

The (N−1) stage delay elements 62 are connected in series to receive the low speed clocks obtained by dividing the high speed clock synchronized with the high speed input signal IN into N and successively produce N number of low speed clocks cl1 to clN shifted in phase from each other. The N number of code converters (22) are driven by the low speed clock (c1) from corresponding delay elements.

Further, each of the (N−1) stage delay units 63 is comprised of a D-FF circuit as illustrated and is driven by a high speed clock CL synchronized with a high speed input signal IN.

Figure 13:
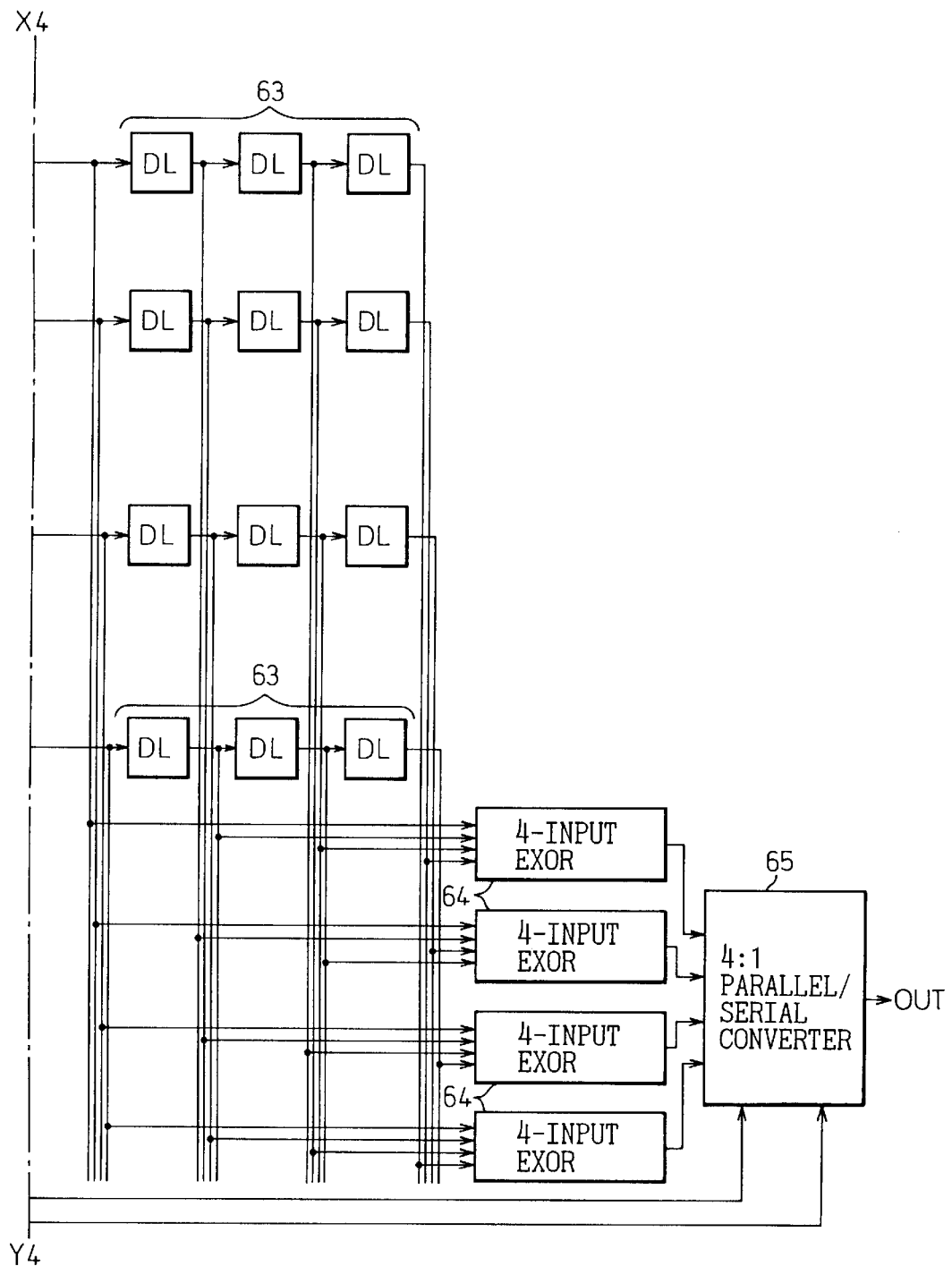
FIG. 13 is a view of a modification of the configuration shown in FIG. 12.

FIG. 13 is a view of a modification of the configuration shown in FIG. 12. The difference from FIG. 12 is that each of the (N−1) stage delay units 63 is comprised of a delay device DL as illustrated.

Figure 14:
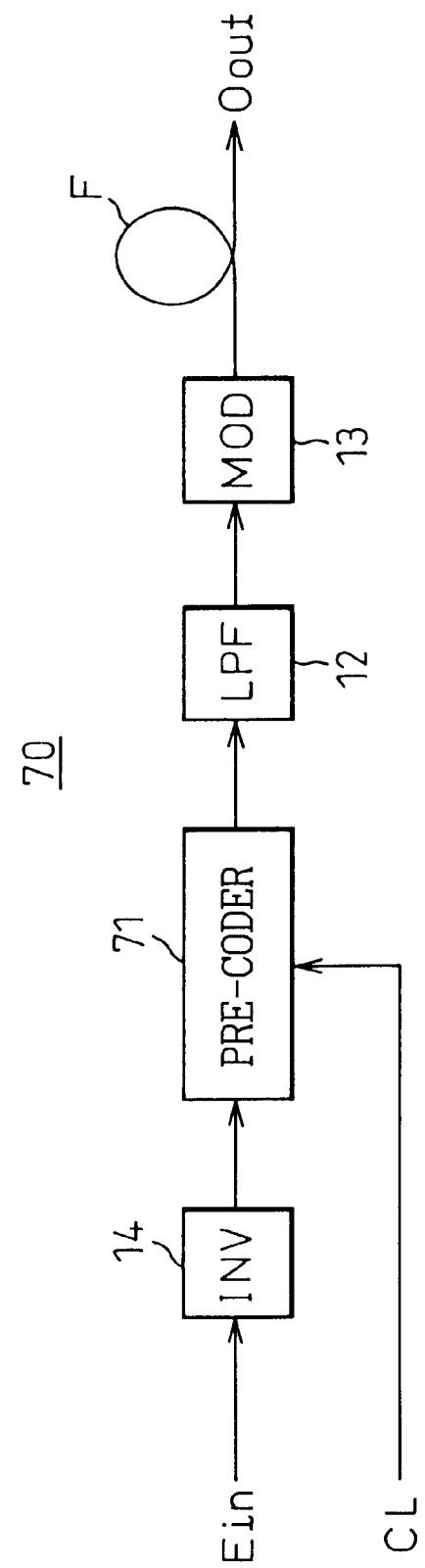
FIG. 14 is a view of an optical transmitter applying the present invention.

FIG. 14 is a view of an optical transmitter applying the present invention. The optical transmitter 70 uses the code conversion circuit 20 according to the present invention as the pre-coder 71. The Ein, Oout, F, etc. in the figure are the same as those shown in FIG. 16 explained before.

Figure 15:
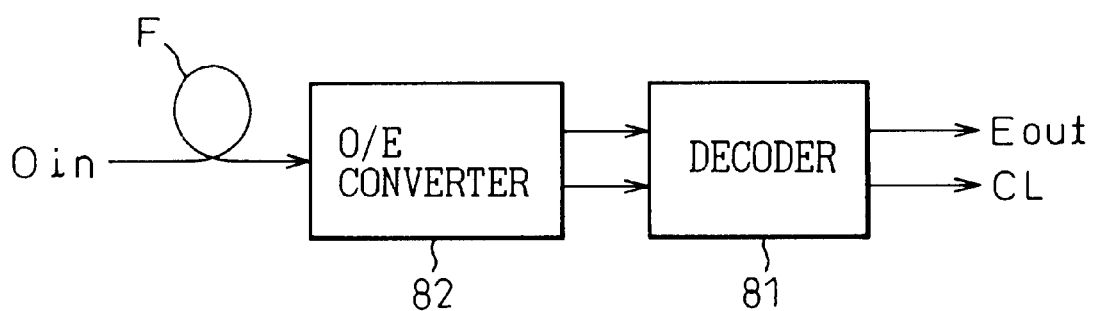
FIG. 15 is a view of an optical receiver applying the present invention.

FIG. 15 is a view of an optical receiver applying the present invention. The optical receiver 80 uses the code conversion circuit 20 according to the present invention as a decoder 81. The Oin in the figure is an optical input signal, while Eout is an electrical output signal. Reference numeral 82 is the already explained O/E converter and converts an optical signal to an electrical signal.

Summarizing the effect of the invention, according to the present invention, optical duobinary transmission which greatly eases the harsh time restriction of the delay time by a delay element 16 with respect to one time slot can be realized. This effect becomes more remarkable the higher the bit rate of the signal to be transmitted, for example, 10 Gb/s, 20 Gb/s, 40 Gb/s . . .

What is claimed is:

1. A code conversion circuit for optical duobinary transmission comprising:

a bit distributing unit receiving a high speed input signal and dividing the input signal into N (N being an integer of 2 or more) ways of low speed signals;

N number of code converters provided corresponding to the N ways divided low speed signals and each performing code conversion by logically processing both the corresponding low speed signals and a delayed 1-bit preceding fed back low speed signal; and a bit combining unit receiving as input the N ways of code converted low speed signals output from the N number of code converters, logically processing and combining the low speed and producing a code converted high speed output signal.

2. A code conversion circuit as set forth in claim 1, wherein each of the code converters includes an EXOR circuit producing an EXOR output of the corresponding low speed signal and a delayed 1-bit preceding fed back low speed signal.

3. A code conversion circuit as set forth in claim 2, wherein each of the code converters further has a D-FF circuit connected to the output side of the EXOR circuit and producing said delayed 1-bit preceding fed back low speed signal.

4. A code conversion circuit as set forth in claim 3, wherein said D-FF circuit operates by a corresponding one of the N number of divided clocks obtained by dividing a high speed clock synchronized with the high speed input signal by N.

5. A code conversion circuit as set forth in claim 4, further provided with (N−1) stage delay elements serially connected to successively produce the N number of divided clocks.

6. A code conversion circuit as set forth in claim 1, wherein said bit distributing unit is comprised of a serial/parallel converter.

7. A code conversion circuit as set forth in claim 6, wherein said serial/parallel converter receives as input said high speed input signal and a high speed clock synchronized with said high speed input signal and outputs the serial/parallel converted N ways of low speed signals and N number of low speed divided clocks obtained by dividing the high speed clock by N, the low speed clocks being input to the corresponding code converters.

8. A code conversion circuit as set forth in claim 1, wherein said bit combining unit is comprised of an EXOR circuit which receives as input the N ways of divided low speed signals and outputs a high speed output signal.

9. A code conversion circuit as set forth in claim 1, wherein N is any of 2, 4, 6, and 8.

10. A code conversion circuit for optical duobinary transmission comprising:
- a 1:N serial/parallel converter receiving a high speed input signal serially and dividing the input signal into N (N being an integer of at least 2) ways of low speed signals;
- N number of code converters provided corresponding to the parallel N ways of low speed signals divided in parallel and performing code conversion on the corresponding low speed signals;
- (N−1) stage delay units serially connected and provided for the N number of code converters to successively delay the code-converted outputs from the code converters,
- N-input EXOR units provided corresponding to the N number of code converters to logically process the outputs from the code converters and the outputs from the (N−1) stage delay units following the code converters; and
- an N:1 parallel/serial converter combining the outputs from the N number of N-input EXOR units corresponding to the N number of code converters and producing a high speed output signal.

11. A code conversion circuit as set forth in claim 10, wherein
further provision is made of (N−1) stage delay elements serially connected receiving low speed clocks obtained by dividing the high speed clock synchronized with the high speed input signal into N and successively producing N number of low speed clocks and
the N number of code converters are driven by the low speed clock from one corresponding delay element.

12. A code conversion circuit as set forth in claim 11, wherein each of the (N−1) stage delay units is comprised of a D-FF circuit, which is driven by a high speed clock synchronized with said high speed input signal.

13. A code conversion circuit as set forth in claim 10, wherein each of the (N−1) stage delay units is comprised of a delay device.

14. A code conversion circuit as set forth in claim 10, wherein said N:1 parallel/serial converter is an existing parallel/serial converter in an optical transmitter comprising, as pre-coders, said N number of code converters, said (N−1) number of delay units, and said N-input EXOR units.

15. A code conversion circuit as set forth in claim 10, wherein said 1:N serial/parallel converter is an existing serial/parallel converter in an optical receiver comprising, as decoders, said N number of code converters, said (N−1) number of delay units, and said N-input, EXOR units.

16. An optical transmitter including a pre-codes, wherein said pre-coder comprises:
- a bit distributing unit receiving a high speed input signal and dividing the input signal into N (N being an integer of 2 or more) ways of low speed signals;
- N number of code converters provided corresponding to the N number of divided low speed signals and each performing code conversion by logically processing both the corresponding low speed signals and a delayed 1-bit preceding fed back low speed signal; and
- a bit combining unit receiving as input the N ways of code converted low speed signals output from the N number of code converters, logically processing and combining the low speed signals, and producing a code converted high speed output signal.

17. An optical receiver including a decoder, wherein said decoder comprises:
- a bit distributing unit receiving a high speed input signal and dividing the input signal into N (N being an integer of 2 or more) ways of low speed signals;
- N number of code converters provided corresponding to the N ways divided low speed signals and each performing code conversion by logically processing the corresponding low speed signals and a delayed 1-bit preceding fed back low speed signal; and
- a bit combining unit receiving as input the N ways of code converted low speed signals output from the N number of code converters, logically processing and combining the low speed signals, and producing a code converted high speed output signal.

* * * * *

UNITED STATES PATENT AND TRADEMARK OFFICE
CERTIFICATE OF CORRECTION

PATENT NO. : 6,595,707 B1
DATED : July 22, 2003
INVENTOR(S) : Naoki Kuwata

It is certified that error appears in the above-identified patent and that said Letters Patent is hereby corrected as shown below:

Column 13,
Line 4, after "speed" insert -- signals, --.

Column 14,
Line 28, after "N-input" delete ",".

Signed and Sealed this

Twenty-fifth Day of May, 2004

JON W. DUDAS
*Acting Director of the United States Patent and Trademark Office*